(12) United States Patent
Huggett et al.

(10) Patent No.: US 11,351,628 B2
(45) Date of Patent: Jun. 7, 2022

(54) ON-LINE PHASED ARRAY ULTRASONIC TESTING SYSTEM FOR FRICTION STIR WELDING APPLICATIONS

(71) Applicants: Daniel J. Huggett, Denham Springs, LA (US); Mohammad W. Dewan, Baton Rouge, LA (US); Muhammad A. Wahab, Baton Rouge, LA (US); Thunshun W. Liao, Baton Rouge, LA (US); Ayman M. Okeil, Baton Rouge, LA (US)

(72) Inventors: Daniel J. Huggett, Denham Springs, LA (US); Mohammad W. Dewan, Baton Rouge, LA (US); Muhammad A. Wahab, Baton Rouge, LA (US); Thunshun W. Liao, Baton Rouge, LA (US); Ayman M. Okeil, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

(*) Notice: Subject to any disclaimer, the term of this patent is extended or adjusted under 35 U.S.C. 154(b) by 0 days.

(21) Appl. No.: 16/075,000

(22) PCT Filed: Feb. 9, 2017

(86) PCT No.: PCT/US2017/017232
§ 371 (c)(1),
(2) Date: Aug. 2, 2018

(87) PCT Pub. No.: WO2017/165010
PCT Pub. Date: Sep. 28, 2017

(65) Prior Publication Data
US 2019/0388998 A1     Dec. 26, 2019

Related U.S. Application Data

(60) Provisional application No. 62/293,197, filed on Feb. 9, 2016.

(51) Int. Cl.
*B23K 20/12* (2006.01)
*G01N 29/06* (2006.01)
(Continued)

(52) U.S. Cl.
CPC ......... *B23K 20/123* (2013.01); *G01N 29/069* (2013.01); *G01N 29/0645* (2013.01);
(Continued)

(58) Field of Classification Search
CPC ...... B23K 20/123; B23K 31/125; G01H 3/08; G01N 2291/106; G01N 2291/2675;
(Continued)

(56) References Cited

U.S. PATENT DOCUMENTS 2,953,017 A      9/1960  Bincer et al.
3,350,923 A  *  11/1967  Cross ............... G01N 29/28
                                                              73/617

(Continued)

OTHER PUBLICATIONS

Written Opinion/International Search Report received in International Patent Application No. PCT/US2017/017232, dated Sep. 6, 2017.
(Continued)

*Primary Examiner* — Nimeshkumar D Patel
*Assistant Examiner* — Nashmiya S Fayyaz
(74) *Attorney, Agent, or Firm* — Venable LLP; Keith G. Haddaway; Elizabeth C. G. Gitlin

(57) ABSTRACT

A wedge for on-line inspection of a weld includes a wedge body defining a coolant channel and at least one couplant channel, and a coolant input port in fluid connection with a first end of the coolant channel. The wedge body has a
(Continued)

surface for disposing a phased array ultrasonic transducer comprising an array of ultrasonic elements. The coolant channel is formed in proximity to the surface for disposing the phased array ultrasonic transducer such that coolant flowing through the coolant channel maintains the phased array ultrasonic transducer below a predetermined temperature without obstructing the array of ultrasonic elements.

17 Claims, 30 Drawing Sheets

(51) Int. Cl.
  *G01N 29/07* (2006.01)
  *G01N 29/11* (2006.01)
  *G01N 29/22* (2006.01)
  *G01N 29/24* (2006.01)
  *G01N 29/26* (2006.01)
  *G01N 29/265* (2006.01)
  *G01N 29/28* (2006.01)
  *G01N 29/32* (2006.01)
(52) U.S. Cl.
  CPC .............. *G01N 29/07* (2013.01); *G01N 29/11* (2013.01); *G01N 29/221* (2013.01); *G01N 29/2437* (2013.01); *G01N 29/262* (2013.01); *G01N 29/265* (2013.01); *G01N 29/28* (2013.01); *G01N 29/326* (2013.01); *G01N 2291/106* (2013.01); *G01N 2291/2675* (2013.01)
(58) Field of Classification Search
  CPC .. G01N 29/0645; G01N 29/069; G01N 29/07; G01N 29/11; G01N 29/221; G01N 29/2437; G01N 29/262; G01N 29/265; G01N 29/28; G01N 29/326; G01N 29/4463
  USPC .......................................................... 73/644
  See application file for complete search history.

(56) References Cited

U.S. PATENT DOCUMENTS

| | | | | |
|---|---|---|---|---|
| 4,567,770 | A * | 2/1986 | Rumbold | G01N 29/28 73/617 |
| 5,635,644 | A * | 6/1997 | Ishikawa | G01B 17/025 73/614 |
| 7,628,075 | B2 * | 12/2009 | Kennedy | G01N 29/225 73/628 |
| 2009/0134203 | A1 | 5/2009 | Domec et al. | |
| 2010/0326962 | A1 * | 12/2010 | Calla | B23K 9/0956 219/76.14 |
| 2011/0209547 | A1 | 9/2011 | Revoirard et al. | |
| 2012/0091185 | A1 * | 4/2012 | Ume | B23K 9/173 228/1.1 |
| 2013/0014571 | A1 * | 1/2013 | Quinones | G01N 29/265 73/112.05 |
| 2014/0352436 | A1 | 12/2014 | Zhang | |
| 2018/0065204 | A1 * | 3/2018 | Burrows | G05B 19/4207 |

OTHER PUBLICATIONS

ASME, Article 23 Ultrasonic Standards, in SE-797. The Standard Practice for Measuring Thickness by Manual Ultrasonic Pulse-Echo Contact Method. (1998).
Azar et al., "Beam focusing behavior of linear phased arrays", NDT&E Int., 2000, vol. 33, No. 3, pp. 189-198.
Bird, "Ultrasonic phased array inspection technology for the evaluation of friction stir welds", Insight, 2004, vol. 46, No. 1, pp. 31-36.
Carpentier et al., "Manual Ultrasonic Inspection of Thin Metal Welds", 11th European Conference on Non-Destructive Testing. Prague, Czech Republic,Oct. 6-10, 2014.
Choqueuse et al., "Use of Phased Array Ultrasonic Equipment For Fatigue Crack Characterization For Underwater Inspection of Offshore Structures", Proceedings of the Eighth International Offshore and Polar Engineering Conference, May 24-29, 1998, vol. IV, pp. 86-89.
Crowther, "Practical experience of phased array technology for power station applications", Insight-Non-Destructive Testing and Condition Monitoring, 2004, vol. 46, No. 9, pp. 525-528.
Deuster, "Reasons for Crack Closure and Possibilities for Detection and Sizing by NDE", Int. J. Pres. Ves. Pip., 1988, vol. 35, pp. 173-188.
Dewan et al., "Prediction of tensile strength of friction stir weld joints with adaptive neuro-fuzzy inference system (ANFIS) and neural network", Materials and Design., 2016, vol. 92, pp. 288-299.
Dewan et al., "Effect of post-weld heat treatment and electrolytic plasma processing on tungsten inert gas welded AISI 4140 alloy steel", Materials and Design, 2014, vol. 54. pp. 6-13.
Ditchburn et al., "NDT of welds: State of the art", NDT & E International, 1996, vol. 29, No. 2, pp. 111-117.
Ditchburn et al., "Ultrasonic Phased Arrays for the Inspection of Thick-Section Welds", Australian Department of Defense Science and Technology Organization, 2009.
Drinkwater et al., "Ultrasonic arrays for non-destructive evaluation: A review", NDT&E Int., 2006, vol. 39, pp. 525-541.
Johnson et al., "Temperature and Annealing Dependence of the Longitudinal Ultrasonic Velocity in Aluminum-Alloys", Journal of Materials Research, 1993, vol. 8, No. 7, pp. 1558-1566.
Kirk et al., "Ultrasonic arrays for monitoring cracks in an industrial plant at high temperatures", IEEE Transactions on Ultrasonics Ferroelectrics and Frequency Control, 1999, vol. 46, No. 2, pp. 311-319.
Kleiner et al., "Signal processing for quality assurance in friction stir welds", Insight, 2004, vol. 46, No. 2, pp. 85-87.
Lamarre et al., "Complete Inspection of Friction Stir Welds in Aluminum using Ultrasonic and Eddy Current Arrays", Proceedings of the 7th International Conference on Trends in Welding Research. Callaway Gardens Resort, Pine Mountain, Georgia, USA. (2005).
Leonard et al., "Flaws in Friction Stir Welds", in 4th international symposium on Friction Stir Welding, May 2003: Park City, Utah, USA. p. 14-16.
Levesque et al., "Laser ultrasonics for defect detection and residual stress measurement of friction stir welds", Nondestruct Test. Eval., 2011, vol. 26, Nos. 3-4, pp. 319-333.
Li, "The study on defects in aluminum 2219-T6 thick butt friction stir welds with the application of multiple non-destructive testing methods", Materials & Design, 2011, vol. 32, No. 4, pp. 2073-2084.
Mandache et al., "Non-destructive detection of lack of penetration defects in friction stir welds",. Sci Technol Weld Joi., 2012, vol. 17, No. 4, pp. 295-303.
Mandache et al., "Pulsed Eddy Current Testing of Friction Stir Welds", Materials Evaluation, 2008, vol. 66, No. 4, pp. 382-386.
Moles et al., "Ultrasonic Phased Arrays for Thick Section Weld Inpections", Proceedings from Joining of Advanced and Specialty Materials, Oct. 13-15, 2003, Pittsburgh, PA, United States: ASM International. (2004), pp. 112-118.
Rosado et al., "A differential planar eddy currents probe: Fundamentals, modeling and experimental evaluation", NDT&E Int., 2012, vol. 51, pp. 85-93.
Rosado et al., "Advanced technique for non-destructive testing of friction stir welding of metals", Measurement, 2010, vol. 43, No. 8, pp. 1021-1030.
Rosado et al., "Eddy currents testing probe with magneto-resistive sensors and differential measurement",. Sensor Actuat A-Phys., 2014, vol. 212 pp. 58-67.
Rose, "A Baseline and Vision of Ultrasonic Guided Wave Inspection Potential", J. Press. Vess. T. ASME. Aug. 2002, vol. 124, pp. 273-282.
Rose, "Guided Wave Nuances for Ultrasonic Nondestructive Evaluation", IEEE Transactions on Ultrasonics, Ferroelectronics, and Frequency Control, May 2000, vol. 47, No. 3, pp. 575-583.

(56) References Cited

OTHER PUBLICATIONS

Santos et al., "A new NDT System for Micro Imperfections Detection: Application to FSW and FSpW", Weld World, 2009, vol. 53, Nos. 5-6, pp. 99-108.

Santos et al., "Electrical conductivity field analysis for evaluation of FSW joint AA6013 and AA7075 alloys", J. Mater Processing Technology, 2011, vol. 211, No. 2, pp. 174-180.

Schmmer, "Fundamentals of Ultrasonic Phased Arrays", Modern Physics Letters B, 2008, vol. 22, No. 11, pp. 917-921.

Schneider et al., "Reliability of Manually Applied Phased Array Inspection", 4th European-American Workshop on Reliability of NDE. Berlin, Germany. (2009), p. 1-8.

Shih et al., "Applications of Flexible Ultrasonic Transducer Array for Defect Detection at 150 C", Sensors, 2013, vol. 13, No. 1, pp. 975-983.

Smith, "The potential for friction stir weld inspection using transient eddy currents", Insight., 2005, vol. 47, No. 3, pp. 133-143.

Subbaratnam et al., "Time of Flight Diffraction Testing of Austenitic Stainless Steel Weldments at Elevated Temperatures", Materials Evaluation, 2008, vol. 66, No. 3, pp. 332-337.

Tariq et al., "Characterization of Material Properties of 2xxx Series Al-Alloys by Non Destructive Testing Techniques", Journal of Nondestructive Evaluation, 2012, vol. 31, No. 1, pp. 17-33.

Wooh et al., "Optimum beam steering of linear phased arrays", Wave Motion, 1999, vol. 29, pp. 245-265.

\* cited by examiner

ON-LINE PHASED ARRAY ULTRASONIC TESTING SYSTEM FOR FRICTION STIR WELDING APPLICATIONS This application is a National Stage Application under 35 U.S.C. § 371 of PCT/US2017/017232, filed on Feb. 9, 2017, which claims priority to U.S. Provisional Application No. 62/293,197, filed on Feb. 9, 2016, the entire content of each of which is hereby incorporated by reference.

This invention was made with government support under grant number NNM13AA02G awarded by NASA. The government has certain rights in the invention.

BACKGROUND

1. Field of Invention

The field of the currently claimed embodiments of this invention relates to testing systems for welding applications, and more particularly to an on-line phased array ultrasonic testing system for friction stir welding applications.

2. Discussion of Related Art

Friction Stir Welding (FSW) is a relatively new solid-state welding technique. FSW has become popular with government research organizations and the private sector, specifically in the welding of aluminum alloys (AA) for aerospace applications. Industries which specifically utilize said technique are aerospace, automotive, and maritime disciplines. FSW is now the leading technique which has overcome the problems of porosity and hot-cracking encountered in fusion welding of AA [1].

SUMMARY

According to some embodiments of the invention, a wedge for on-line inspection of a weld includes a wedge body defining a coolant channel and at least one couplant channel, and a coolant input port in fluid connection with a first end of the coolant channel. The wedge further includes a coolant output port in fluid connection with a second end of the coolant channel, at least one couplant input port in fluid connection with a first end of the at least one couplant channel, and at least one couplant output port in fluid connection with a second end of the at least one couplant channel, the couplant output port being disposed on a lower surface of the wedge body. The wedge body has a surface for disposing a phased array ultrasonic transducer comprising an array of ultrasonic elements. The coolant channel is formed in proximity to the surface for disposing the phased array ultrasonic transducer such that coolant flowing through the coolant channel maintains the phased array ultrasonic transducer below a predetermined temperature without obstructing the array of ultrasonic elements.

According to some embodiments of the invention, a phased array ultrasonic testing system for friction stir welding includes a wedge body defining a coolant channel and at least one couplant channel, and a scanning assembly in mechanical connection with the wedge body, the scanning assembly comprising fixtures for securing the wedge body to a friction stir welder. The wedge body has a surface for disposing a phased array ultrasonic transducer comprising an array of ultrasonic elements. The coolant channel is formed in proximity to the surface for disposing the phased array ultrasonic transducer such that coolant flowing through the coolant channel maintains the ultrasonic transducer below a predetermined temperature without obstructing the array of phased array ultrasonic elements. The scanning assembly maintains a predetermined distance between the wedge body and a weld seam formed in a sample by the friction stir welder during a welding process.

BRIEF DESCRIPTION OF THE DRAWINGS

Further objectives and advantages will become apparent from a consideration of the description, drawings, and examples.

FIG. 30 is a PAUT illustration of multiple legs scanning an FS weld with a TR defect on AS;

DETAILED DESCRIPTION

Figure 1:
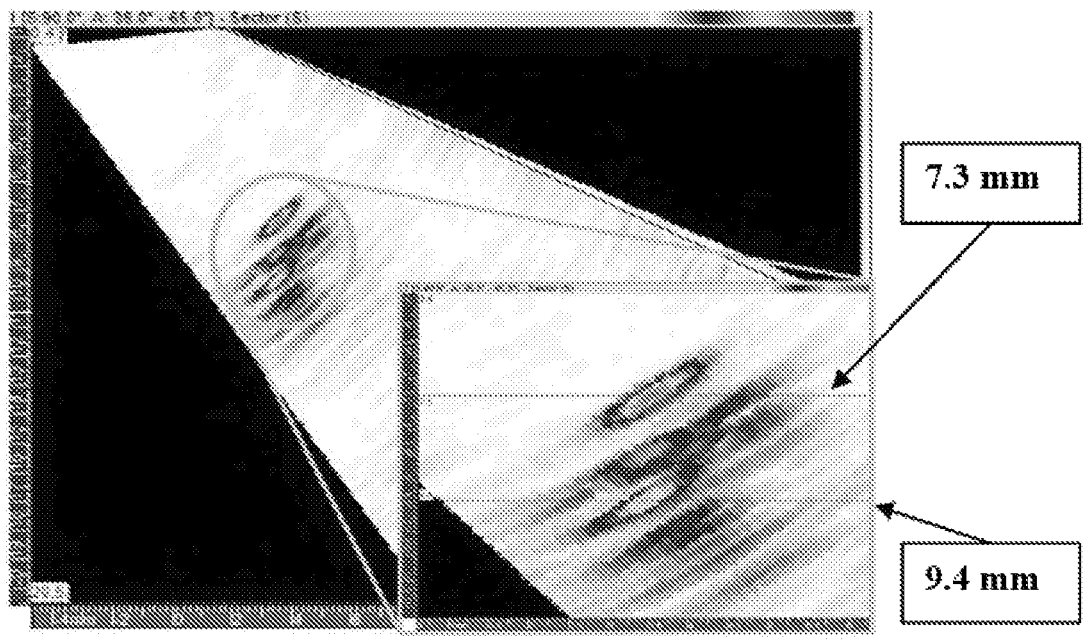
FIG. 1 shows a sectorial scan image illustrating internal defects located in a friction stir welded panel.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

In order for a welded structure to be certified for use, a rigorous evaluation program is conducted to determine quality and reliability. These tests include destructive and non-destructive evaluation (NDE). NDE of welded structures is paramount in industry. NDE techniques are required to have high reliability and accurate defect-sizing capabilities [2] in order to successfully evaluate welded structures, especially in the aerospace industry. One such NDE technique is phased array ultrasonic testing (PAUT). As technology for ultrasonic testing has improved, PAUT has replaced the conventional ultrasonic methods as well as other non-destructive testing (NDT) techniques in many post-weld evaluation applications [3, 4]. PAUT offers increased inspection sensitivity and coverage as well as decreased inspection times. PAUT allows the operator to better determine the size, shape, and orientation of a defect versus traditional pulse echo techniques [5, 6]. Furthermore, there are three levels of certification of NDT methods including level I, level II, and level III. NDT training is based upon the NDT Body of Knowledge (BOK) and can be found in the ANSI/ASNT American National Standard CP-105, ASNT Standard Topical Outlines for Qualification of Nondestructive Testing Personnel.

The most common scan views (images) that a PAUT system utilizes are A, B, C, and S scans. If there is a defect present in the scanned samples, it can be visualized with 6-dB color change [7-9]. The S-scan is perhaps the most useful PAUT form for post-weld evaluation due to the ability to steer the sound waves in a range of angles which allows for easy visualization of a specimen [4]. A complete guide to PAUT can be found in Schmmer Jr, L. W., *Fundamentals of Ultrasonic Phased Arrays*. Modern Physics Letters B and *Fundamentals of Ultrasonic Phased Arrays* (Springer International Publishing). [10, 11]. The present invention as described herein addresses issues related to the application of PAUT to FSW.

Non-destructive evaluation (NDE) techniques including PAUT are limited when applied at high temperatures, which prevents usefulness for on-line real-time inspection of welded joints. Currently in industry, and particularly specifically for aerospace applications, PAUT is not employed during welding to ascertain defects in welded structures. Instead, the inspection is performed offline once the workpiece has cooled, for example, using post-weld NDE. On-line detection would highly impact manufacturing, increasing efficiency while decreasing cost by cutting back significantly the wastages of defective welds and/or weld repair time. For a variety of reasons, welding operations have the propensity to introduce flaws into the weld. Since flaws are detrimental to the integrity of any engineering structure, and typically occur inside the weld, NDE methods such as ultrasonic testing and radiography are necessary to check weld quality. Therefore, a robust and reliable on-line NDE system is most desirable to detect flaws early enough to stop the process if flaws are intolerable, and to save valuable resources.

NASA has stated interest to further develop FSW technology and improve manufacturing processes (Ref: NASA documents-NRA NNM12ZP, Jan. 2, 2013) by development of methods to monitor friction stir (FS) welds. Accordingly, the present invention arises from an extensive experimental investigation to design and build an on-line FS weld defect detection system. An on-line PAUT-NDE system for FSW has been developed and successfully tested, as described herein.

Figure 2A:
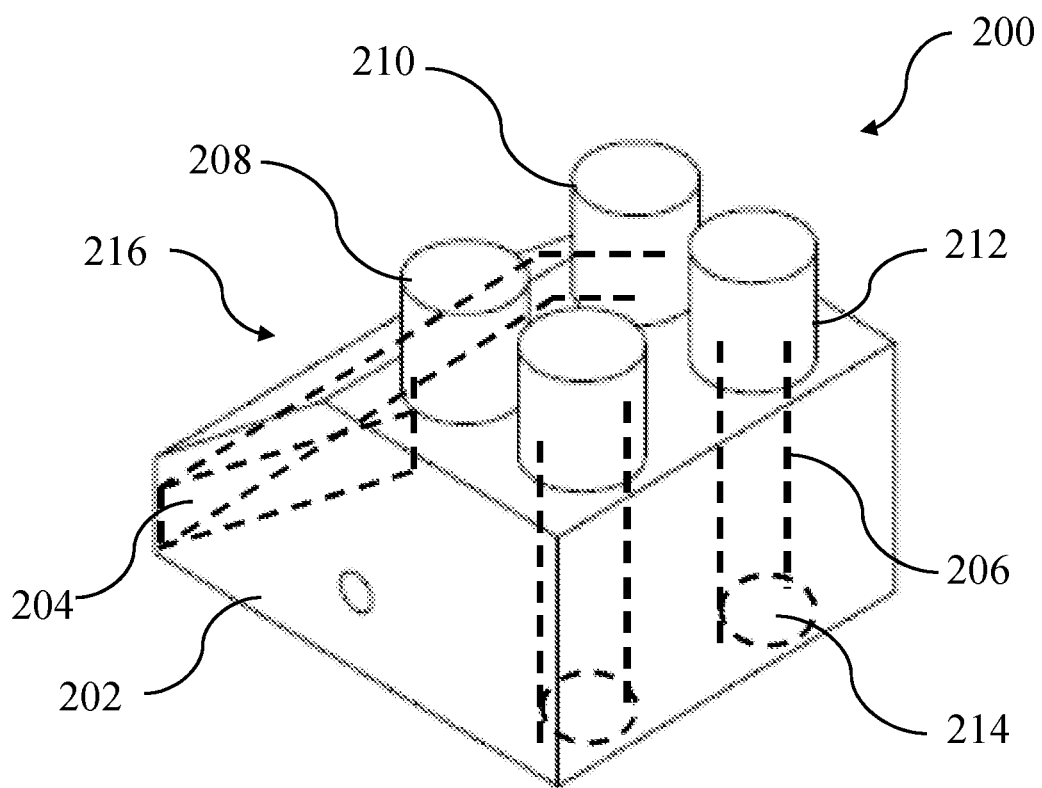
FIG. 2A is a schematic drawing of a wedge for on-line inspection of a weld according to some embodiments of the invention.

A wedge for on-line inspection of a weld according to some embodiments of the invention is shown in FIG. 2A. The wedge 200 includes a wedge body 202 defining a coolant channel 204 and at least one couplant channel 206. The wedge further includes a coolant input port (one of ports 208 and 210) in fluid connection with a first end of the coolant channel 204, and a coolant output port (the other of ports 208 and 210) in fluid connection with a second end of the coolant channel 204. The wedge further includes at least one couplant input port 212 in fluid connection with a first end of the at least one couplant channel 206. The wedge further includes at least one couplant output port 214 in fluid connection with a second end of the at least one couplant channel 206, the couplant output port 214 being disposed on a lower surface of the wedge body 202. The wedge body 202 has a surface 216 for disposing a phased array ultrasonic transducer comprising an array of ultrasonic elements. The coolant channel 204 is formed in proximity to the surface 216 for disposing the phased array ultrasonic transducer such that coolant flowing through the coolant channel 204 maintains the phased array ultrasonic transducer below a predetermined temperature without obstructing the array of ultrasonic elements.

Figure 2B:
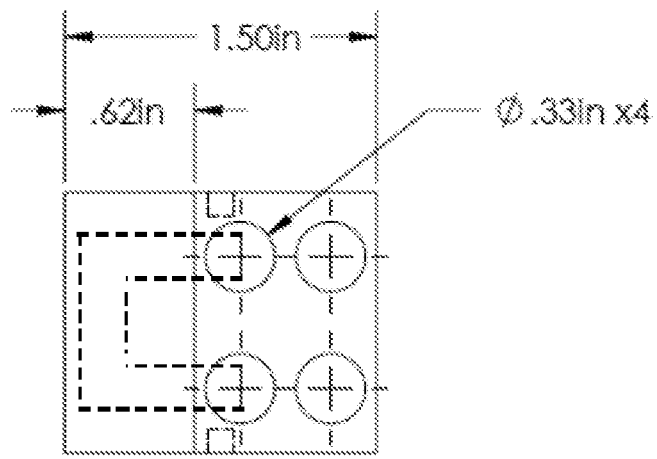
FIG. 2B is a top-down view of a wedge for on-line inspection of a weld according to some embodiments of the invention.

According to some embodiments of the invention, the coolant input port and the coolant output port (208 and 210) are disposed on an upper surface of the wedge body 202, and the coolant channel 204 extends along three sides of an area corresponding to the array of ultrasonic elements (See FIG. 2B). According to some embodiments of the invention, the coolant channel 204 extends in a plane that is parallel to the surface for disposing the phased array ultrasonic transducer (See FIG. 2B). According to some embodiments of the invention, the wedge body 202 further defines holes for securing the wedge body 202 to a scanning assembly.

Figure 2C:
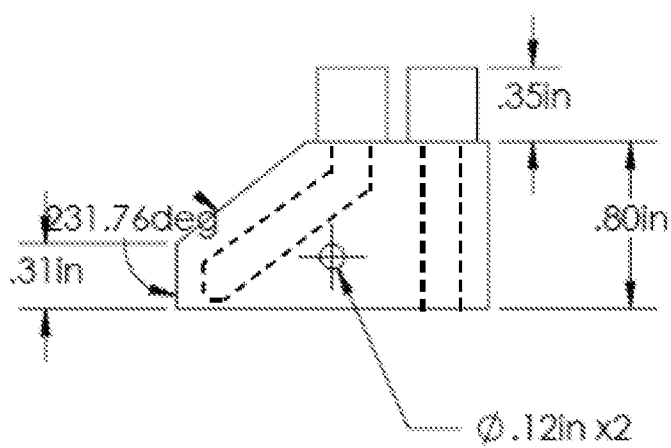
FIG. 2C is a side view of a wedge for on-line inspection of a weld according to some embodiments of the invention.
Figure 2D:
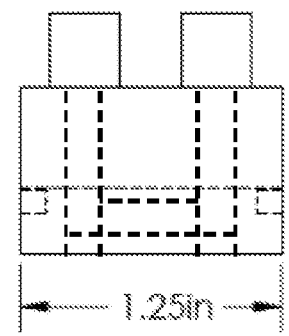
FIG. 2D is a rear view of a wedge for on-line inspection of a weld according to some embodiments of the invention.

FIGS. 2B-2D show top-down, side, and rear view of a wedge according to some embodiments. The embodiments of the invention are not limited to the dimensions shown in FIGS. 2B-2D. These dimensions are provided as examples, and other dimensions may be used.

According to some embodiments, the wedge body 202 comprises a material that is temperature rated near a eutectic melting temperature of welded alloy. According to some embodiments, the wedge body 202 comprises a high temperature rated material such as polyimide-based plastics. According to some embodiments, the wedge body 202 and the phased array ultrasound transducer are operable on a sample having a surface temperature of at least 200° C. According to some embodiments, the wedge body 202 and the phased array ultrasound transducer are operable on a sample having a surface temperature of at least 300° C. According to some embodiments, the couplant is high temperature couplant having an operating temperature of at least 300° C.

Figure 31A:
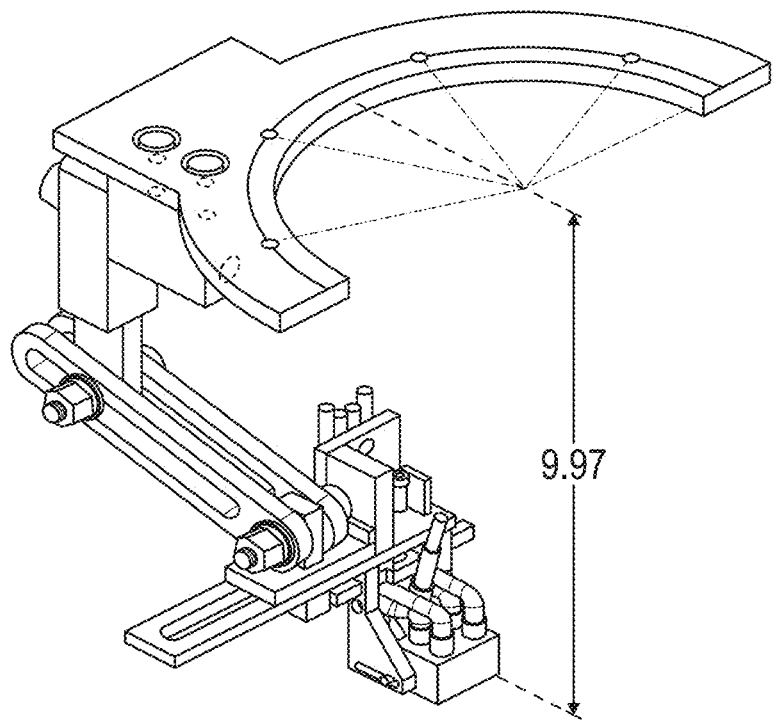
FIG. 31A shows an HT PAUT scanner that can be mounted to FS-welder adapter rings.

According to some embodiments of the invention, a phased array ultrasonic testing system for friction stir welding includes a wedge body defining a coolant channel and at least one couplant channel, and a scanning assembly in mechanical connection with the wedge body, the scanning assembly comprising fixtures for securing the wedge body to a friction stir welder. A scanning assembly according to some embodiments of the invention is shown in FIG. 31A.

The wedge body has a surface for disposing a phased array ultrasonic transducer comprising an array of ultrasonic elements. The coolant channel is formed in proximity to the surface for disposing the phased array ultrasonic transducer such that coolant flowing through the coolant channel maintains the ultrasonic transducer below a predetermined temperature without obstructing the array of phased array ultrasonic elements. The scanning assembly maintains a predetermined distance between the wedge body and a weld seam formed in a sample by the friction stir welder during a welding process.

According to some embodiments of the invention, the scanning assembly comprises a wedge subassembly with arms secured to first and second sides of the wedge body. According to some embodiments, the scanning assembly includes a sliding subassembly comprising an adjustable guiderail, wherein the sliding subassembly allows motion of the wedge body in a direction perpendicular to a welding surface. According to some embodiments, the scanning assembly comprises an adjustment subassembly slideably connected to the sliding subassembly, wherein the sliding subassembly enables motion of the wedge body with respect to the adjustment subassembly in a direction parallel to a welding surface.

According to some embodiments, the system further includes a data processing system in communication with the phased array ultrasound transducer. The data processing system can be configured to receive signals from the phased array ultrasound transducer and process the signals to form an A-scan. According to some embodiments, the data processing system is further configured to process the signals received from the phased array ultrasound transducer to form an S-scan.

According to some embodiments, the system further includes a scanner assembly in mechanical connection with the wedge. The scanner assembly is configured to move the wedge and the phased array ultrasound transducer during a friction stir welding process such that the phased array ultrasound transducer scans a portion of the sample for defects while the sample is being welded.

According to some embodiments, the system further includes a coolant pump in connection with the coolant channel for circulating the coolant. According to some embodiments, the system further includes a couplant pump in connection with the at least one couplant channel for supplying the couplant.

According to some embodiments, the system further includes the phased array ultrasonic transducer. According to some embodiments, the wedge body and the phased array ultrasonic transducer are operable on a sample having a surface temperature of at least 300° C.

According to some embodiments, the wedge and the phased array ultrasound transducer are located within 50 mm, for example within approximately 30 mm, or within about 20 mm, of a weld seam of the sample while the weld seam is being friction stir welded.

According to some embodiments, the data processor is configured to process the S-scan to autonomously detect flaws and provide flaw detection information to an automatic feedback control system. According to some embodiments, the system further includes the automatic feedback control system, wherein the automatic feedback control system commands weld process parameters based on the flaw detection information.

PAUT On-Line Detection System

Welding involves very high temperatures, which is one of the key reasons PAUT is not employed during welding. High temperature (HT) studies on material velocity effects for PAUT on AAs for practical applications are not readily available in open literature. Presented here is a review of the few works that have been obtained.

An early investigation of steels at high temperatures was conducted in Ref [13] utilizing conventional ultrasonic techniques. At 400° C. a system was created to mount piezoelectric arrays to steel in an industrial plant. It is stated that the system effectively detected 1 mm side drilled holes at room temperature and 400° C. Subbaratnam et al. [14] investigated ultrasonic time of flight diffraction (TOFD) in austenitic stainless steel. TOFD tests evaluated at 149.85° C. resulted in degradation of ultrasonic signals which was compensated with an increase in gain values above what was required at ambient conditions.

It is seen that similar trends arise in Johnson et al. [15]. In their study, various AA's (AA-1100, AA-2024-T351, AA-6061-T6, AA-7075-T6) longitudinal ultrasonic velocities were measured as temperature of the specimens was increased to solidus temperature. The work employed a Nd:YAG laser with pulses of 15 ns with energy 700 mJ to excite ultrasonic waves. It is stated that at high temperatures (approximately greater than 400° C.) linear temperature dependence deviates. Development towards creating a flexible transducer array at 150° C. was conducted in Ref [16].

A study by Tariq et al. [17] examined various AAs including AA-2219 which illuminated that ultrasonic testing can be conducted to correlate hardness values to material velocity and attenuation. The study states that the material velocity of AA-2219 with a hardness (HV) of 138 correlates with a longitudinal velocity, with a 4 MHz probe, of 6.354 mm/µs.

Employing knowledge gained from post-weld FSW analysis, a method to incorporate FSW conditions was employed for real time PAUT scanning, and a system was developed that provides non-destructive evaluation capability on-line during the FSW process, as well as other inspection processes. First, PAUT transducers are quite sensitive to heat. Typically the elements in a transducer are warranty rated by the manufacturer from 5° C. to 45° C. This is a leading reason why PAUT is seldom employed for HT applications. Consequently, in order to prevent damage to the sensitive piezoelectric elements due to high temperatures, a wedge was designed and fabricated from polyimide material, Vespel® (temperature rated: 287.8° C. constant to 482.2° C. intermittent). As this material is rated near the eutectic melting temperature of binary aluminum-copper alloys (548° C. [18]), this material was deemed suitable for the FSW application. The embodiments of the invention are not limited to polyimides or Vespel, and other temperature rated materials having properties suited for the particular application may be used including other thermoplasitcs, for example, other polymide-based plastics such as Meldin. For use in other applications, other materials may be used as long as they are suitably stable at the temperature of the analysis. According to some embodiments, a high temperature rated material is a material that has a temperature rating of at least 150° C. According to some exemplary embodiments, a high temperature rated material is a material that has a temperature rating of at least 250° C. According to some exemplary embodiments, a high temperature rated material is a material that has a temperature rating of at least 300° C.

Figure 3:
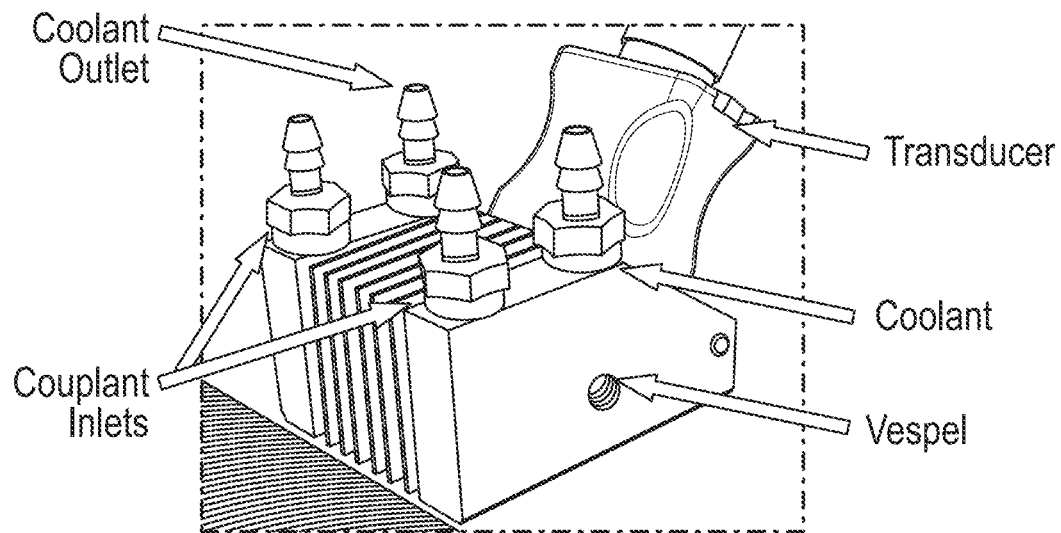
FIG. 3 shows a custom high temperature (HT) phased array ultrasonic testing (PAUT) wedge/transducer unit according to some embodiments of the invention.

The wedge was further designed with a water inlet and outlet connected to a cooling channel for cooling around the transducer casing to ensure piezoelectric element safety. Furthermore, couplant inlets were inserted to allow a steady flow of couplant to the workpiece during scanning, as shown in FIG. 3. In embodiments, the wedge can include 1, 2, or more couplant inlets. The couplant is supplied through the couplant inlets and comes out of the bottom of the wedge to ensure a good film of couplant between the wedge and the material. The effectiveness of the newly designed and fabricated wedge was first tested in a laboratory setting for a simulated controlled environment at ambient and elevated temperatures (23.0° C., 100° C., 200° C., and 300° C.).

Figure 4:
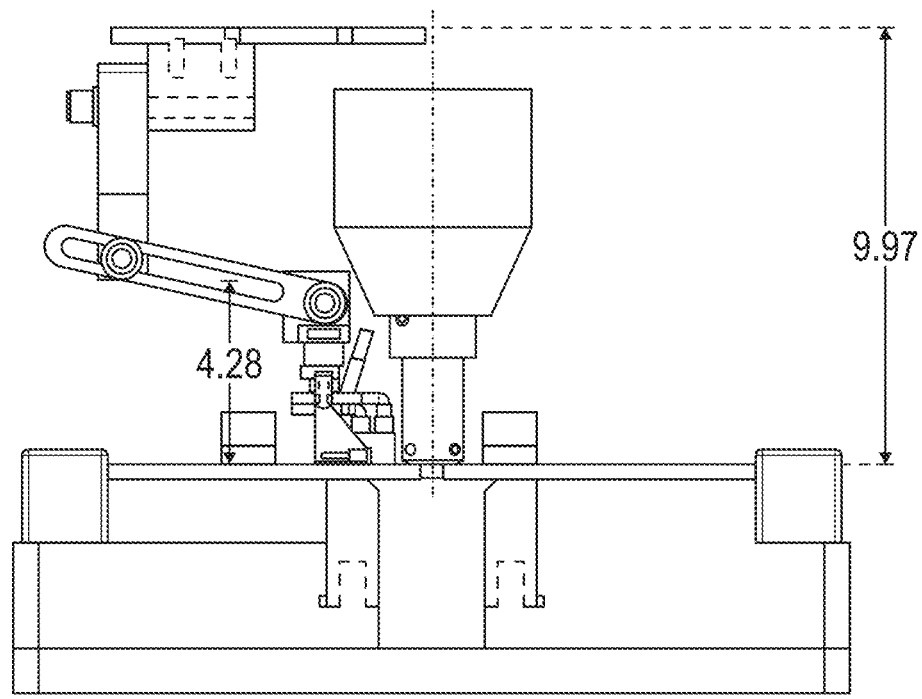
FIG. 4 is an illustration of on-line PAUT scanner design.
Figure 5:
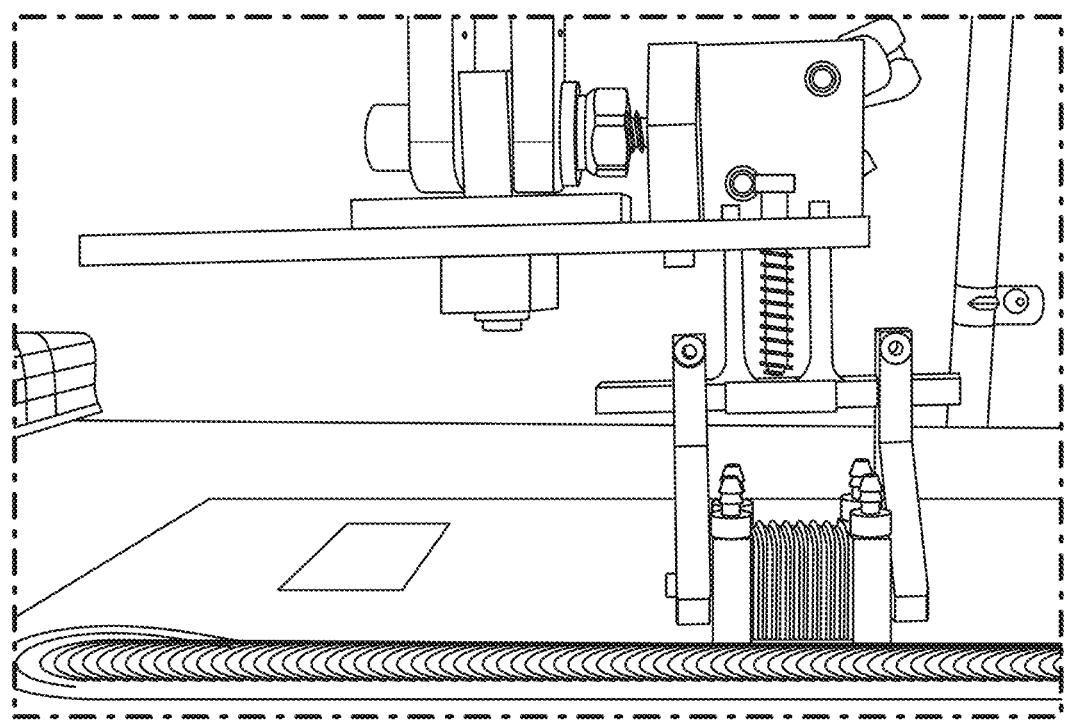
FIG. 5 an on-line scanner situated on top of a friction stir (FS) weld.
Figure 6:
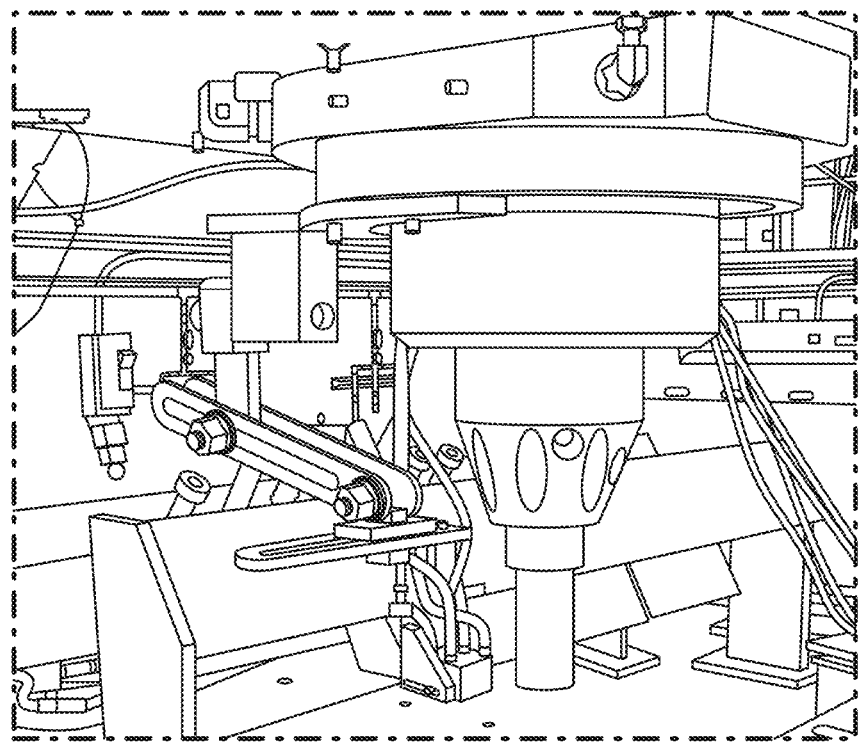
FIG. 6 illustrates the online scanner in close proximity to an FS welder.
Figure 7:
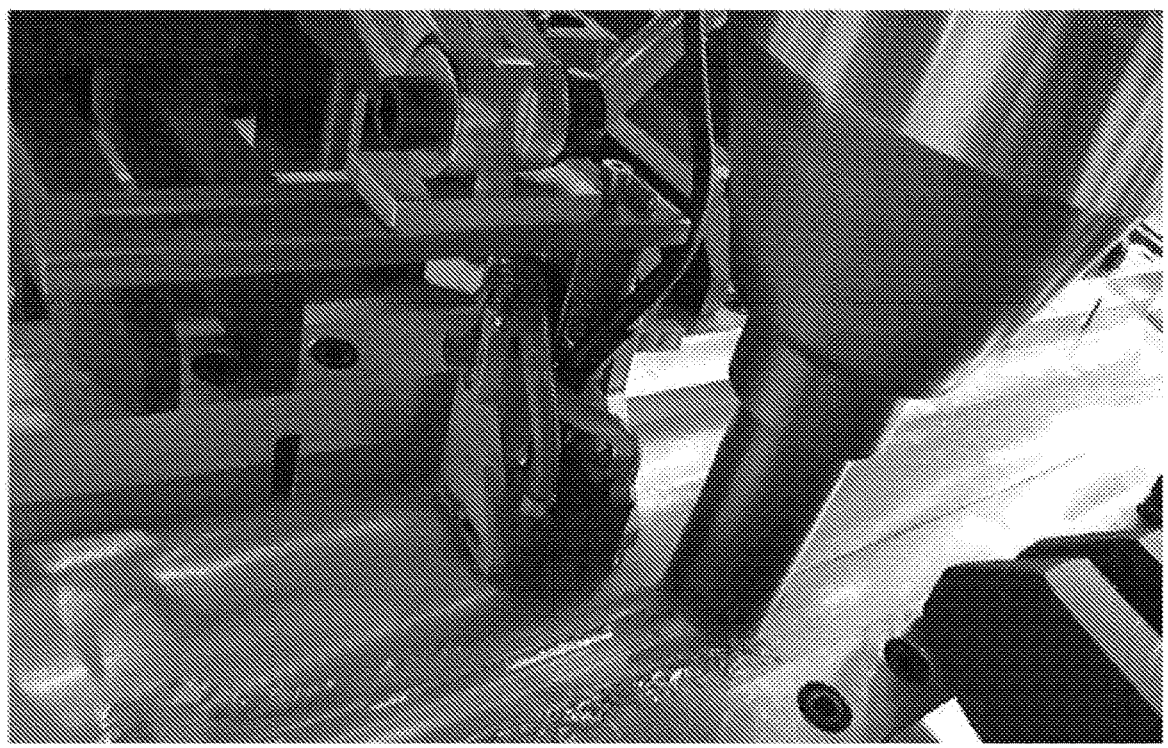
FIG. 7 shows a PAUT on-line defect detection during friction stir welding (FSW)

In order to utilize the HT PAUT wedge/transducer apparatus, a scanner was designed and constructed for a process development system (PDS) friction stir welder located at NASA's Michoud Assembly Facility (MAF) in New Orleans, La. The design and setup of the online scanner with HT PAUT wedge/transducer apparatus is illustrated in FIG. 4. The scanner was designed to fit in tight FSW setups in a robust way that adjusts to different configurations. Offsets of the wedge-probe assembly can be easily adjusted to fit the assembly in the space between the workpiece fixtures at a location where the temperature is within the wedge's tolerable range. The distance between the wedge and the pin tool of the FS welder can be varied using a sliding mechanism at the wedge arms and joint side rails. After the design was completed, the system was constructed and tested. FIG. 5 illustrates the online scanner placed near an FS weld, and FIG. 6 illustrates the online scanner in close proximity to an FS welder. FIG. 7 illustrates operation of the scanner during a FS weld. The on-line scanner can operate at temperatures up to 300° C.

Figure 8:
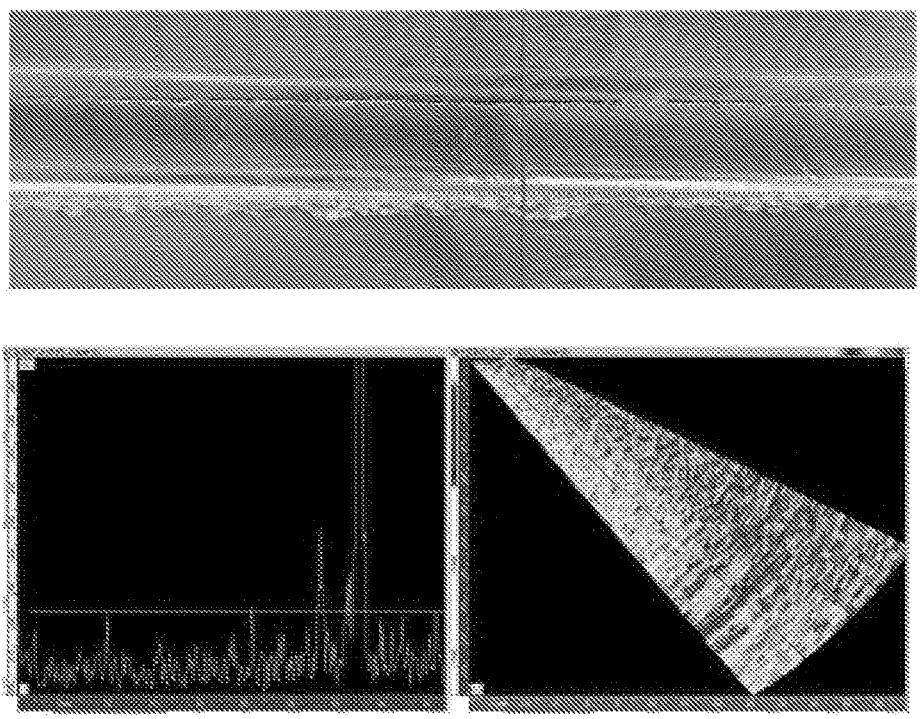
FIG. 8 shows an FS welded trenching (TR) defect (top) with associated A-Scan (bottom left) and S-Scan (bottom right) acquired during welding.

Schedules chosen to weld with the on-line scanner were intentionally picked to produce defects. The process parameters were chosen so that a variation of defect sizes could be observed. It was found that trenching (TR) defects were the most prevalent defect found due to the weld schedules employed. Tests conducted found that when TR defects were created, the PAUT system was able to detect them. Results of a TR defect can be observed in FIG. 8 with associated A-Scan data (left) and S-Scan data (right).

Other features unique to this system:
1. The scanner head can be mechanically linked to the welding head so they travel together at the same distance and same speed;
2. The scanner head can be at a non-normal angle to the weld direction.

For friction stir welding, a pin tool is utilized to weld material to form a rigid joint. The pin tool has a shoulder which is used to prevent the flow of metal out of the seam. The shoulder has a larger diameter compared to the pin, which is the component that plunges into the thickness of the workpiece.

For fixed pin welding, at the start of the weld a build-up of material is created due to dwell time. This dwell stage is required to adequately heat soften material around the pin so that upon transition to traveling, the pin will not encounter cold-hard material, and to allow the shoulder to adequately stir material. As the pin tool dwells, material is expelled out of the seam. If the wedge was pulled behind the tool as it is under normal operating conditions, the HT wedge would come into contact with material and may snag. To circumvent this issue, a rail system was implemented in the scanner so that the wedge can be placed in front of the pin tool during the plunge and dwell stages. As the pin tool travels away from the start point of the weld the wedge will remain stationary until the pin tool passes. After the pin tool passes the HT wedge, the catch slide stops moving and the HT wedge will be pulled at the travel speed of the pin tool, at a specified distance. This is shown in FIG. 7.

As the shoulder rides on top of the weld seam, the HT wedge system has to be placed far enough away from the weld so that during the transition from plunge, dwell, and welding stages, the shoulder will not come into contact with the wedge as it passes.

Some embodiments of the invention are designed specifically for fixed-pin FSW. Self-Reacting FSW would not have this issue.

The distance that the wedge should be located for scanning the FS weld can be chosen such that it does not come into contact with the pin tool upon the aforementioned transition.

Because of it use for online testing, the wedge dimensions are important and create significant challenges in design. The wedge must be small enough to be accommodated in the work surface, but large enough to accommodate a transducer and provide, sufficient cooling to maintain operability of the transducer while at the same time avoiding interference of the transducer by the coolant material, such as water. Optimal dimensions for a wedge for FSW would be small; however, there may be limitations due to sound transmission and noise cancelling tips at the front of PAUT wedges.

The most important size requirement for the system is thus the length of wedge. The height is also a limitation but was not the leading design requirement, and the width must be sufficient to allow for the size of the coolant and couplant channels. However, the system is advantageously constructed to be as compact as possible. According to some embodiments, the couplant channels and coolant channels have a size between about 0.05 inches and about 0.2 inches in diameter. According to some embodiments, the couplant channels and coolant channels have a diameter of about 0.1 inches. The couplant channels and coolant channels may have the diameter, or may have different diameters. According to some embodiments, the channels are drilled and tapped with a 4-40 thread size.

The length measurement of the wedge was based on the distance from the edge of the pin tool shoulder to the chill bar (which is discussed elsewhere in this specification). In a typical wedge configuration, the chill bar is placed a set distance, based upon weld configuration requirements. This distance is usually sufficiently close to the weld to prevent deflection of the panels as one welds. In the illustrated embodiment, the leading edge of the chill bar is placed no farther than 3 inches (7.6 cm) from the weld center line, as anything farther could cause problems with the weld, Therefore, the length of the wedge was designed to be small enough to fit between the chill bar and pin tool shoulder. A small clearance on both sides of the sedge, i.e. from the weld on one side and the chill bar on the other, is also maintained.

FIG. 31A shows an exemplary embodiment of HT PAUT on-line detection scanner system including the wedge body and the scanning assembly that can be mounted to FS-welder adapter rings that are positioned above the tool shoulder adapter and casing of the FS welder. Connecting the scanning system to the weld machine allows versatility by utilizing the weld system to move the PAUT unit. FIG. 4 shows a design for PAUT fixtures relative to the HT PAUT scanner and the pin assembly. The PAUT assembly eliminates travel speed calibrations and ensures that the PAUT unit will have a constant scanning distance relative to the pin-tool once the pin tool has moved a predetermined distance from the initial plunge point. Secondly, the PAUT assembly has adaptability to all major I-STIR-FSW systems. The scanning unit utilizes a spring-loaded system to compensate for the distance that the weld-head travels in the downward direction, and also acts as the opposing force to keep the wedge adhered to the workpiece surface with multiple-degrees-of-freedom to compensate for changes in the pin-tool design or shoulder adapter geometry.

For fixed-pin welds, the plunge stage causes expulsion of metal out of the weld seam. This is a major concern to the scanning system because the wedge would have to plow over the mass of accumulated aluminum which could damage the PAUT unit. For this reason, a catch system is designed, so the PAUT unit can be placed before the weld-head during the plunge stage. In order for the PAUT system to adequately protect transducer, an ice bath will be prepared and filtered through the wedge before welding. Having the wedge at location with a cooler temperature will ensure that the heat from the plunge will not damage the sensitive elements in the transducer. To verify the temperature during welding, a test weld can be conducted without the transducer. At the location where the transducer would be placed, thermocouples can be attached so that temperature identification can be made while coolant is filtered during the weld process. Furthermore, during welding couplant is filtered through the wedge to the workpiece for consistent transmission of ultrasonic waves.

FIGS. 31B-39 provide schematic illustrations of elements of a PAUT online system according to some embodiments of the invention. The illustrations are provided as examples, and the embodiments of the invention are not limited to the elements shown in the illustrations. Further, the embodiments of the invention are not limited to the dimensions shown in the illustration, and other dimensions may also be used.

Figure 31B:
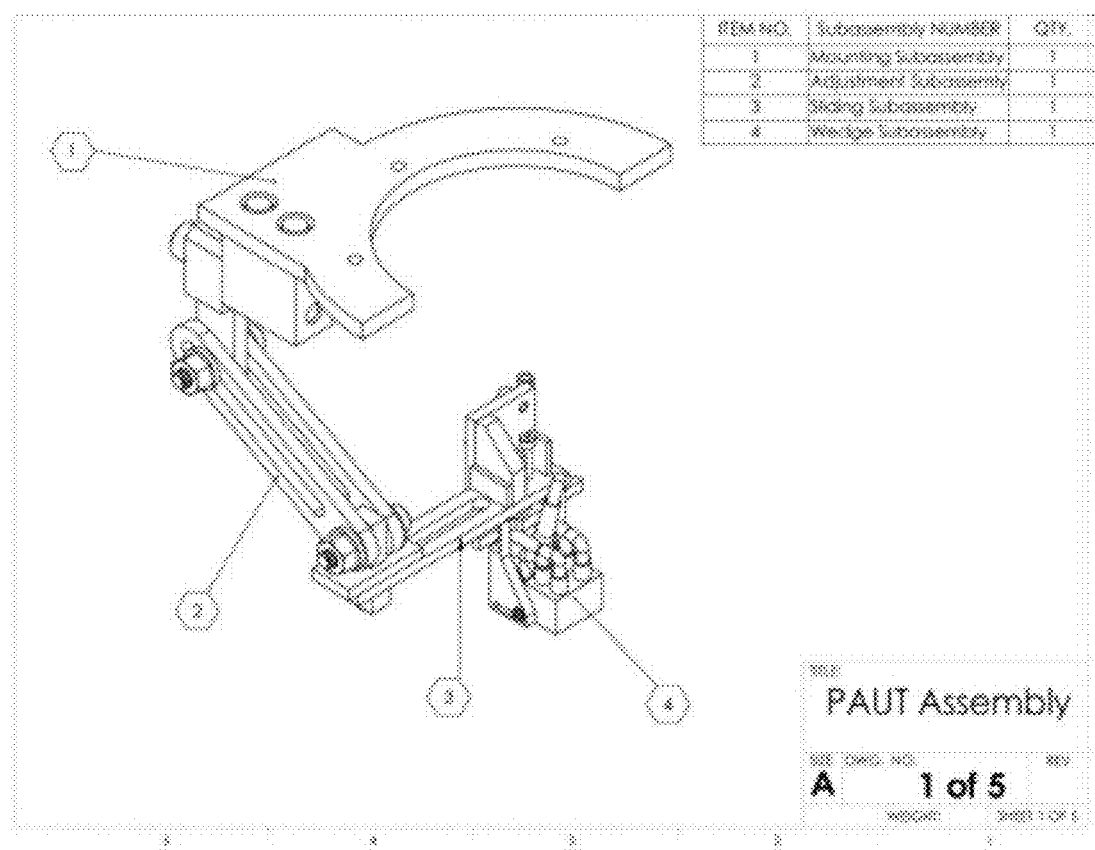
FIG. 31B shows a PAUT assembly with a mounting subassembly, an adjustment subassembly, a sliding subassembly, and a wedge subassembly.
Figure 32:
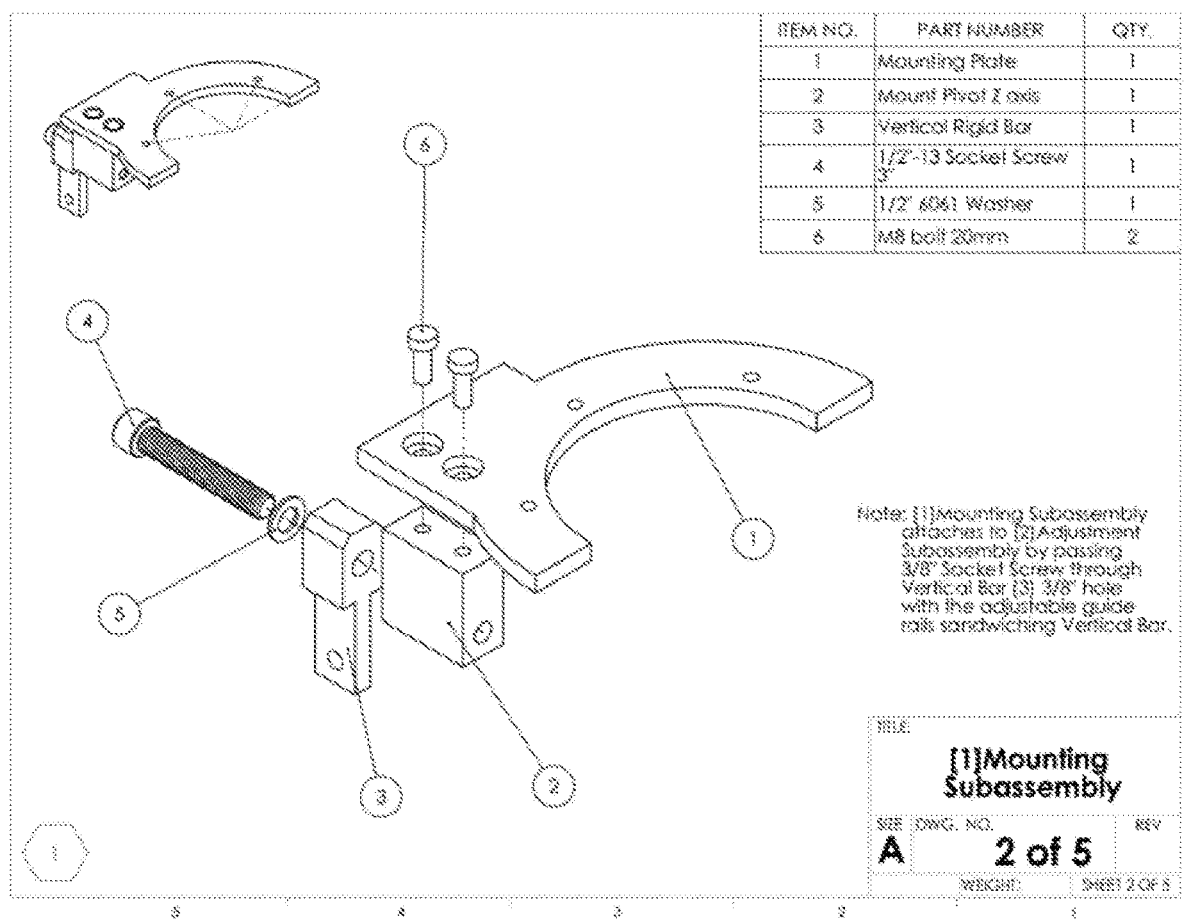
FIG. 32 provides a more detailed schematic of the mounting subassembly of FIG. 31.
Figure 33:
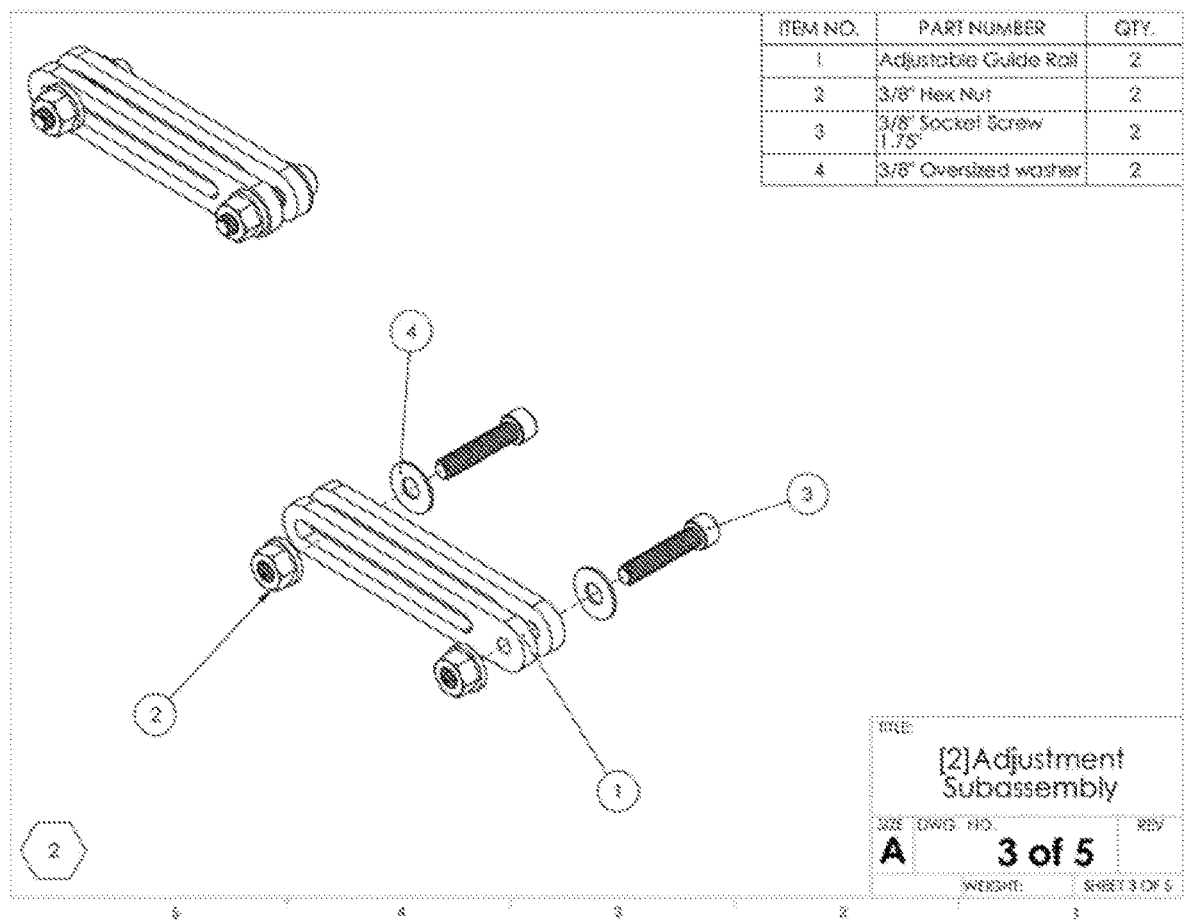
FIG. 33 provides a more detailed schematic of the adjustment subassembly of FIG. 31.
Figure 34:
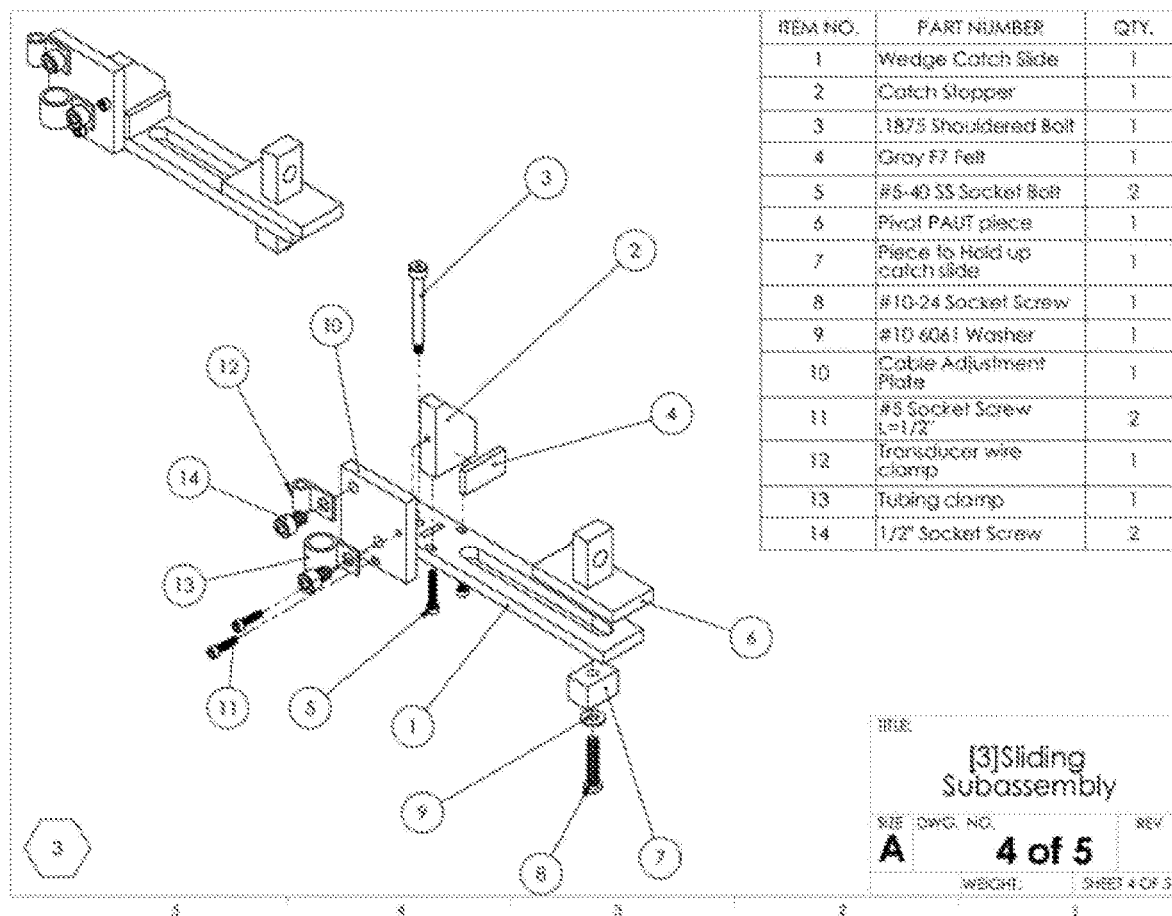
FIG. 34 shows the sliding subassembly of FIG. 31.
Figure 35:
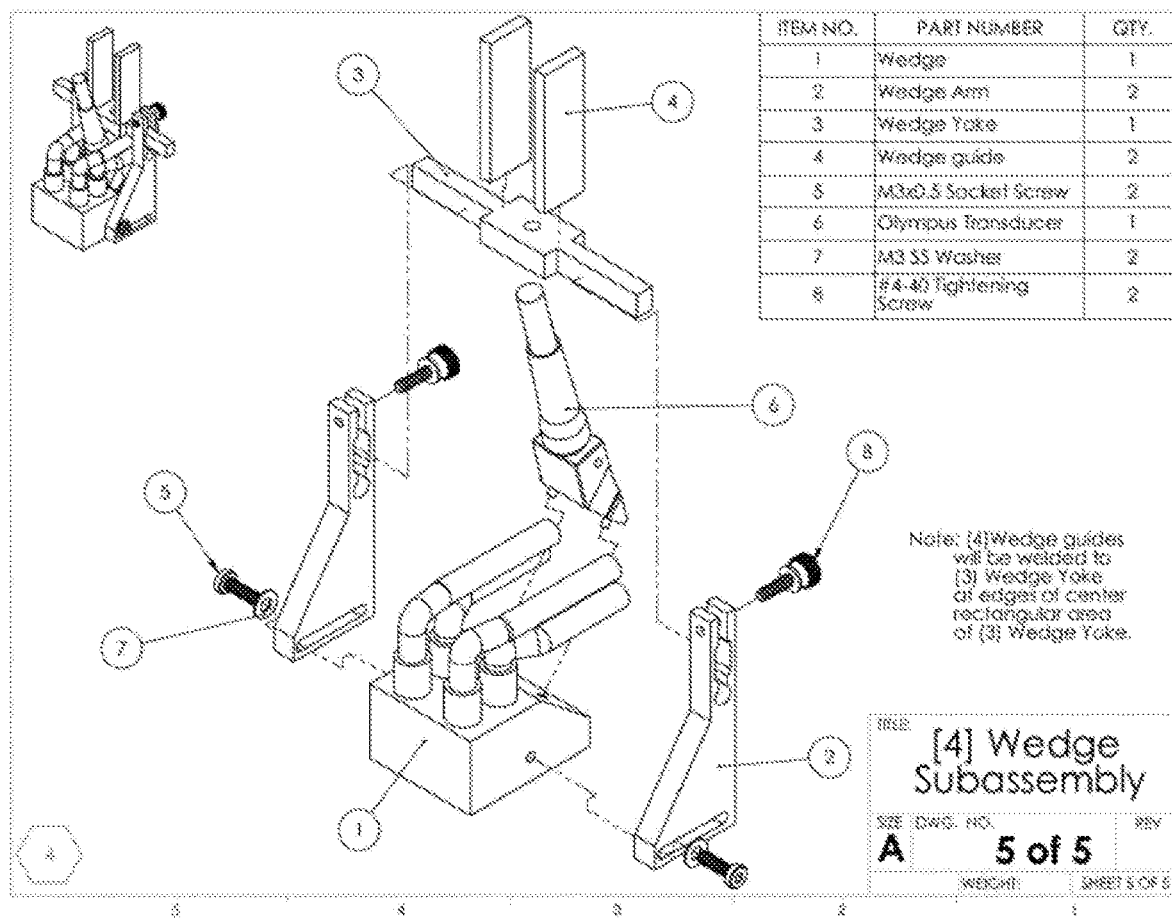
FIG. 35 shows the wedge subassembly of FIG. 31 in more detail.

FIG. 31B shows a PAUT assembly with a mounting subassembly (FIG. 31B Item 1), an adjustment subassembly (FIG. 31B Item 2), a sliding subassembly (FIG. 31B Item 3), and a wedge subassembly (FIG. 31B Item 4). The PAUT assembly may be referred to herein as a "scanning assembly" combined with a "wedge body." FIG. 32 provides a more detailed schematic of the mounting subassembly of FIG. 31B (Item 1). In FIG. 32, the mounting subassembly attaches to the adjustment subassembly (FIG. 31B Item 2) by passing a ⅜" socket screw through a 3/' hole in the vertical bar with the adjustable guide rails sandwiching the vertical bar. FIG. 33 provides a more detailed schematic of the adjustment subassembly (Item 2) of FIG. 31B. FIG. 34 shows the sliding subassembly (Item 3) of FIG. 31B, and FIG. 35 shows the wedge subassembly of FIG. 31B (Item 4) in more detail. The wedge guides in FIG. 35 (FIG. 35 Item 4) can be welded to the wedge yoke (FIG. 35 Item 3) at the edges of the center rectangular area of the wedge yoke.

Figure 36:
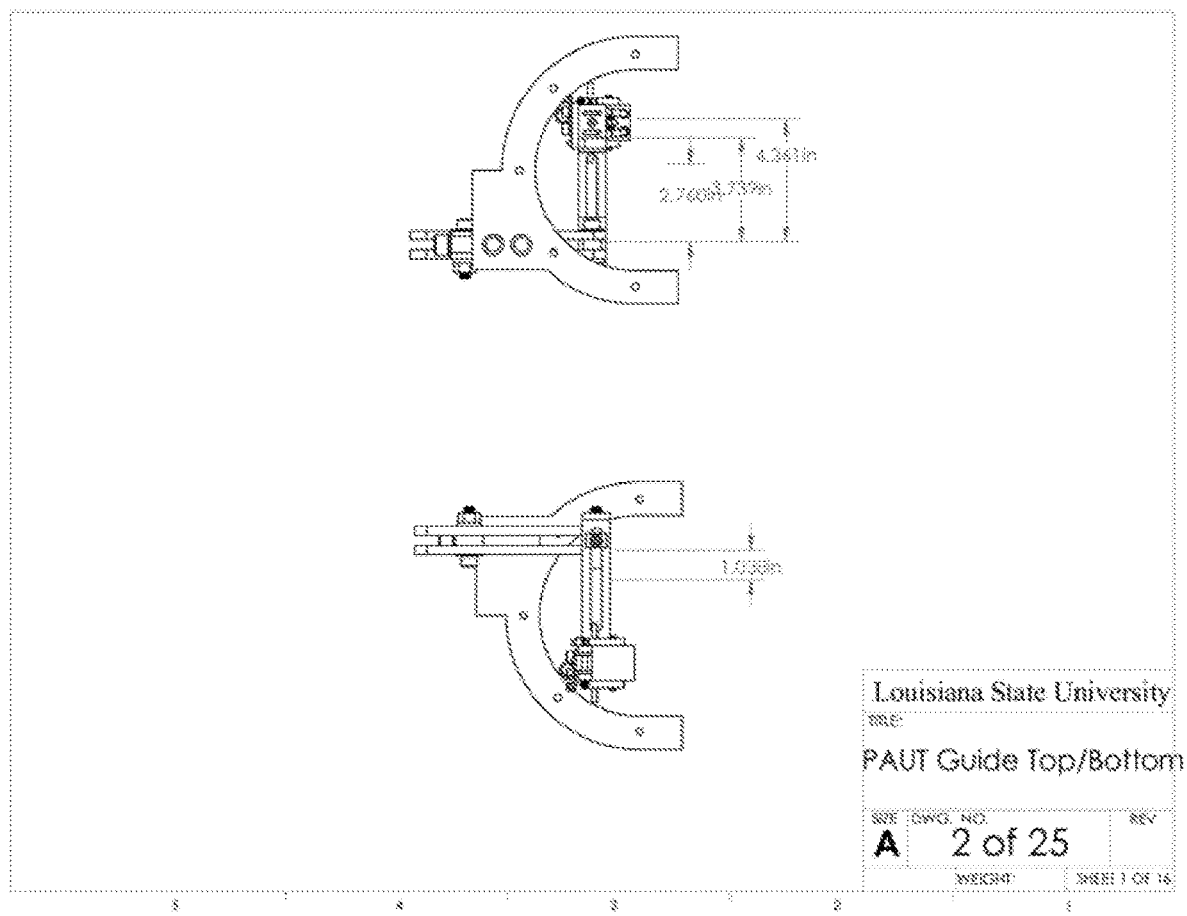
FIG. 36 shows top and bottom views of the PAUT guide.
Figure 37:
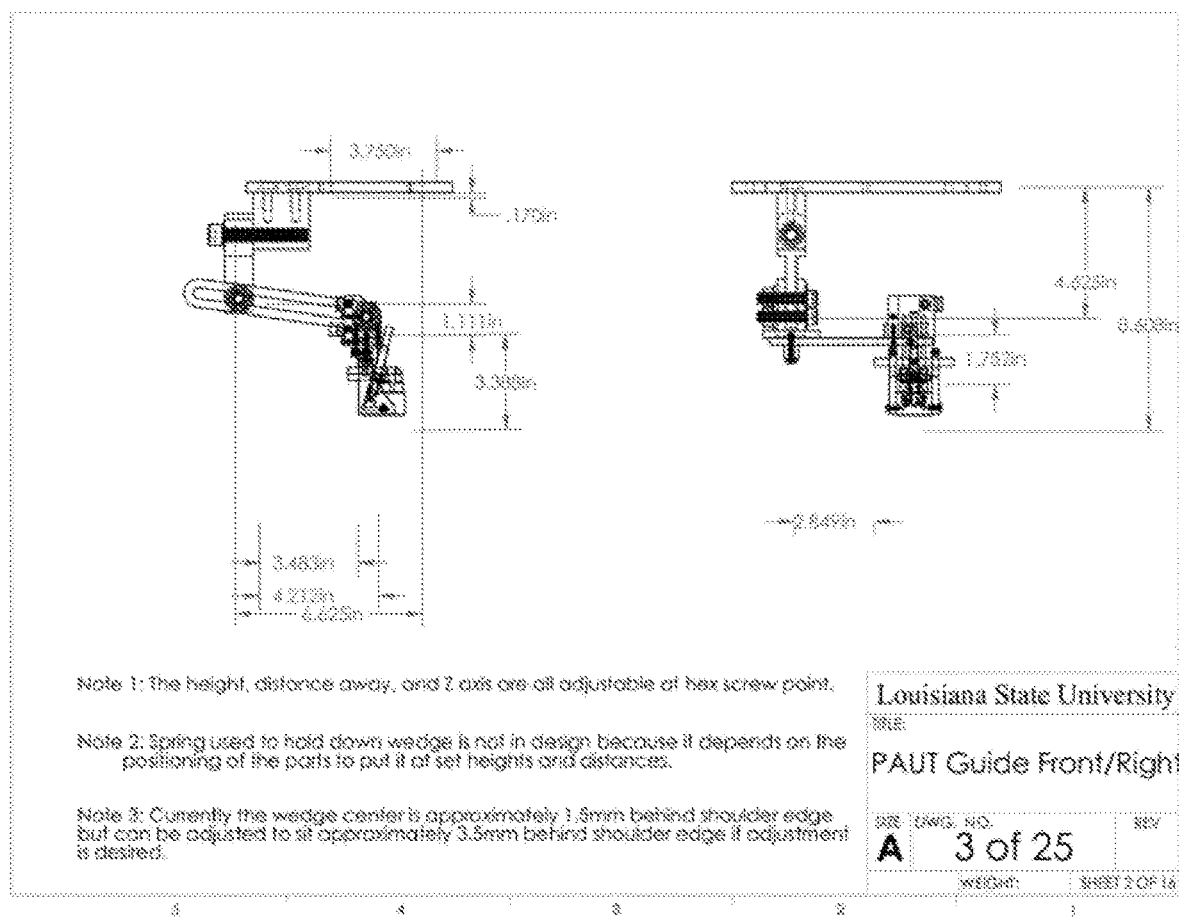
FIG. 37 shows front and right views of the PAUT guide.

FIG. 36 shows top and bottom views of the PAUT assembly of FIG. 31B. FIG. 37 shows front and right views of the PAUT assembly of FIG. 31B.

The HT PAUT system provides NDE capability on-line during the friction stir welding process. The system includes a high-temperature wedge with small dimensionality, and a phased array ultrasonic system that is compatible with friction stir welding fixturing, and can also be used for other inspection applications. The wedge incorporates a coolant channel to ensure that the sensitive piezoelectric elements of the transducer operate at a safe temperature. Couplant ports are also designed into the wedge to allow for a steady flow of couplant under the wedge.

At the beginning of a fixed pin friction stir weld, the rotating tool inserts the pin into the workpiece until the target depth or target axial force is satisfied. Thereafter, the pin tool remains at the start location to allow for advantageous material conditions for welding. During this dwell period, material is expelled out of the weld seam around the pin tool. If the wedge guide were designed such that the wedge always followed the pin tool, the wedge would have to travel up and over the excess material displaced out of the weld joint. This would require the wedge to move in the Z direction as well as in the direction (X or Y) of the weld seam. The scanner system mitigates the issue of forcing the wedge to pass up and over excess material at the start of fixed pin friction stir weld operation by initially positioning the wedge in front of the pin tool. A sliding mechanism at the wedge arms and joint side rails is used to allow the position of the pin tool relative to the wedge to vary. As the pin tool begins to rotate and move forward, the wedge remains stationary for a brief period until the pin tool passes the wedge, and then the sliding mechanism catches and begins to pull the wedge along behind the pin tool, actively scanning the weld in real time as it is being formed. FIG. 7 shows a HT PAUT wedge following a pin tool during welding, with the sliding mechanism visible.

In order to keep the wedge in intimate contact with the workpiece, a spring loaded system provides a downward force. The height, distance away, and position along the Z axis are all adjustable at the hex screw point. A spring can be used to hold down the wedge, but is not shown in the figures because it depends on the positioning of the parts to determine the heights and distances. While the wedge center according to some embodiments is 1.5 mm behind the shoulder edge, it can be adjusted to other positions, for example, to sit approximately 3.5 mm behind the shoulder edge if adjustment is desired.

The vertical rigid bar (FIG. 32 Item 3) of the mounting subassembly allows for the adjustment of the scanner in the z-direction to compensate for any lead angle applied to the FSW machine. The mounting plate (FIG. 32 Item 1) of the mounting subassembly connects to the adapter head of MTS ISTIR friction stir weld machines. This plate is capable of attaching to multiple weld platforms, including process development system (PDS) welder and universal weld system (UWS), for example.

The adjustable guide rails (FIG. 33, Item 1) of the adjustment assembly allow for versatile movement of the wedge in vertical and horizontal directions. The rails provide rigid support to the wedge holder mechanism and allow placement into the friction stir welding fixture.

The PAUT pivot piece (FIG. 34 Item 6) of the sliding subassembly attaches the wedge holder to the guide rails. The catch slide (FIG. 34 Item 1) of the sliding subassembly allows the scanner system to mitigate the issue of making the wedge cross over flash at the start of friction stir welds. The catch slide allows the wedge holder system to be placed at the front of the pin tool during plunge and dwell stages. Once the pin tool begins its weld stage and traverses the weld seam, the friction stir weld gantry will move in the weld direction. The wedge holder system will remain in place until the end of the catch slide, and thereafter the wedge holder will move behind the pin tool for NDE operation.

Figure 38:
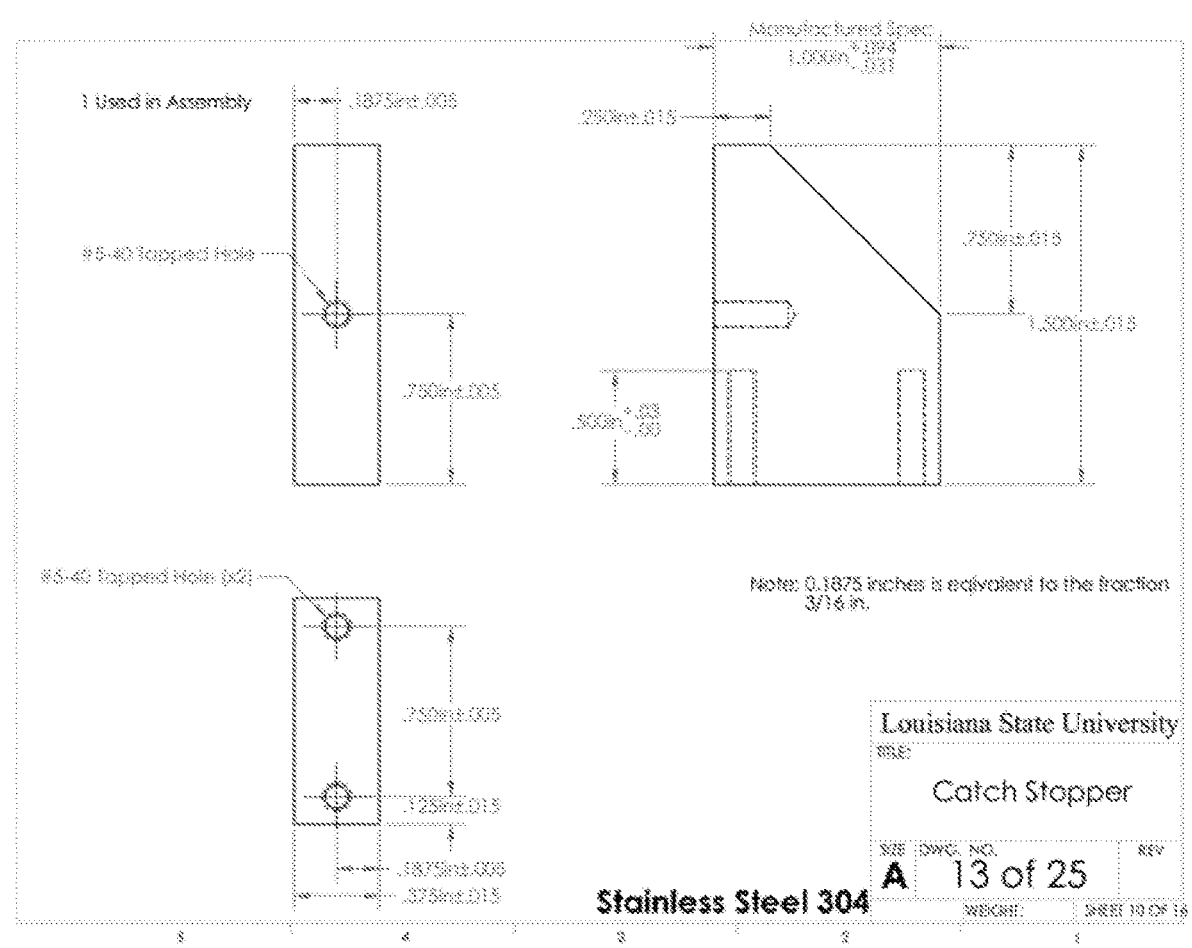
FIG. 38 shows the catch stopper of the sliding subassembly shown in FIG. 34 in more detail
Figure 39:
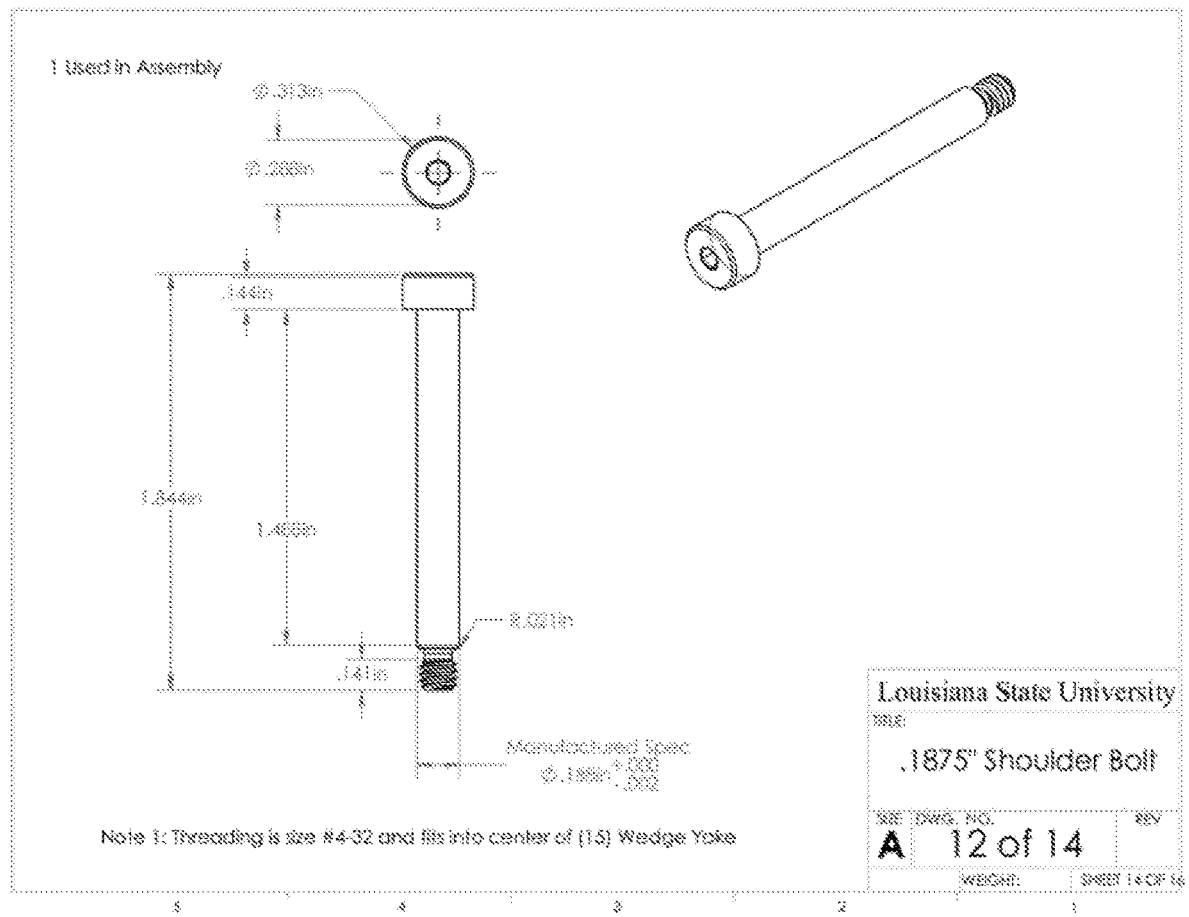
FIG. 39 shows the 0.1875" shoulder bolt of the sliding subassembly shown in FIG. 34 in more detail

FIG. 38 shows the catch stopper of the sliding subassembly shown in FIG. 34 in more detail. FIG. 39 shows the 0.1875" shoulder bolt of the sliding subassembly shown in FIG. 34 in more detail. The spring which provides downward pressure onto the wedge is wrapped around the shoulder bolt (FIG. 34 Item 3) of the sliding subassembly. The bolt remains at a fixed position, and the wedge holder system is free to move up and down the length of the bolt. The spring force allows the wedge to remain in contact with the surface of the workpiece, even if there is a taper angle. This means that the scanning system can accommodate workpieces that are not completely flat.

Figure 40:
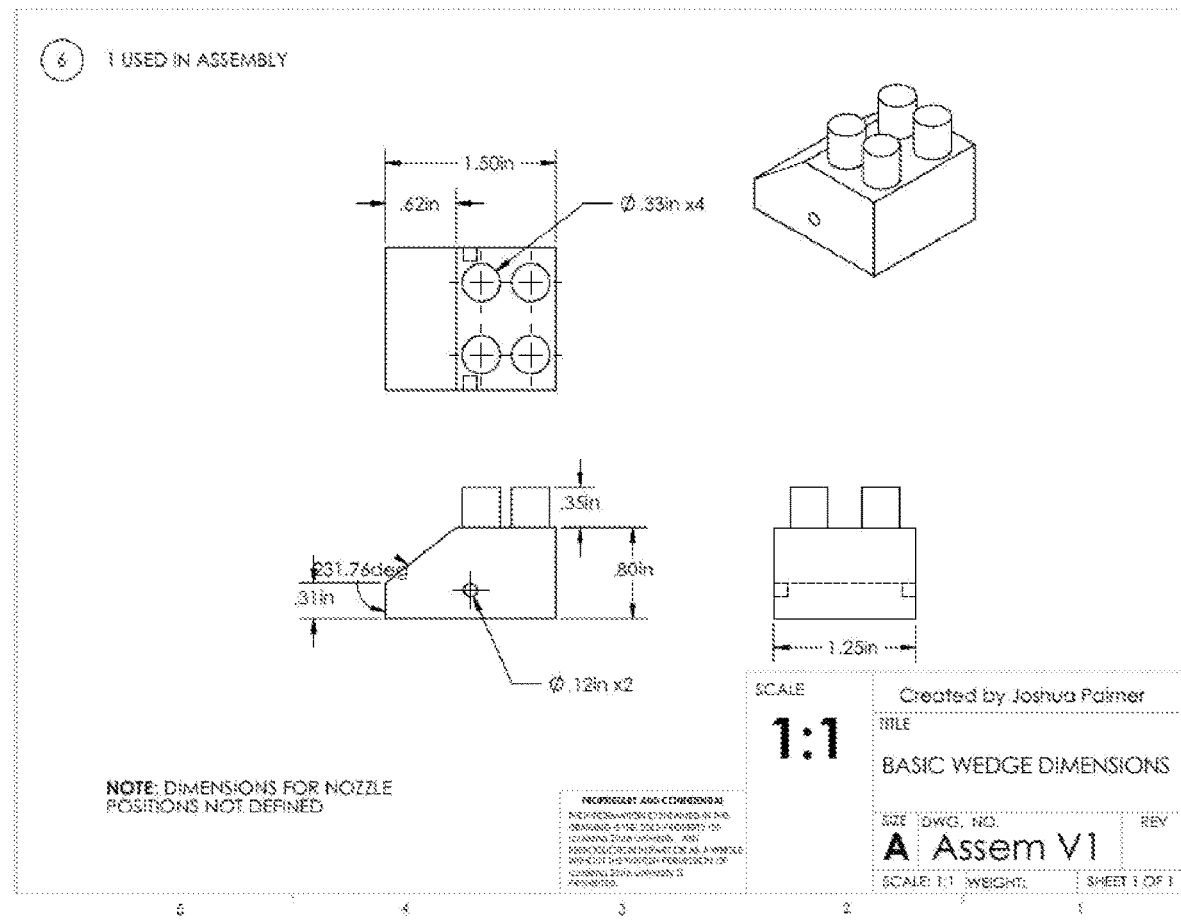
FIG. 40 shows a wedge according to some embodiments of the invention.

FIG. 40 shows a wedge according to some embodiments of the invention. The wedge includes four fluid ports on the upper surface of the wedge. The wedge includes a slanted surface on which the PAUT transducer is disposed. The two fluid ports closest to the slanted surface are a coolant inlet and a coolant outlet. The coolant flows from these ports through a fluid channel that is in close proximity to the PAUT transducer. The coolant fluid channel has a diameter that is small enough that is does not obstruct the ultrasound signals emitted from and detected by the transducer, but large enough that it provides sufficient cooling to maintain the transducer at a safe temperature. The other two fluid ports are for couplant.

According to some embodiments of the invention, the longest side of the wedge is less than 2 inches. According to some embodiments, the longest side of the wedge is about 1.5 inches. According to some embodiments of the invention, the height of the wedge including the fluid ports is less than 1.5 inches. According to some embodiments of the invention, the height of the wedge including the fluid ports is less than 1.2 inches. According to some embodiments, the slanted surface of the wedge begins about 0.3 inches above the surface of the workpiece. According to some embodiments, the wedge includes threaded holes on the side to enable the wedge to be mounted to a guide.

Figure 41:
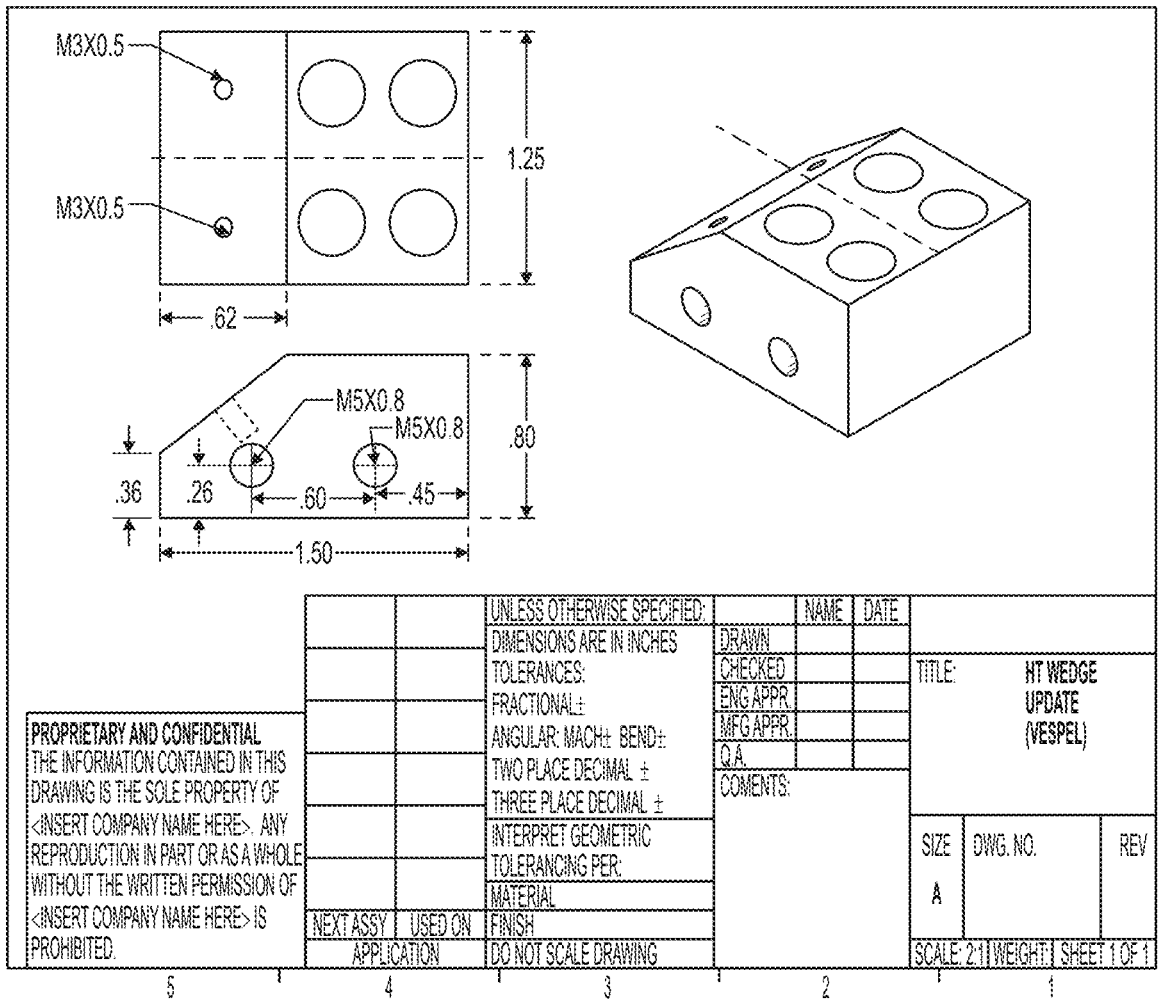
FIG. 41 shows a wedge according to some additional embodiments of the invention.
Figure 42:
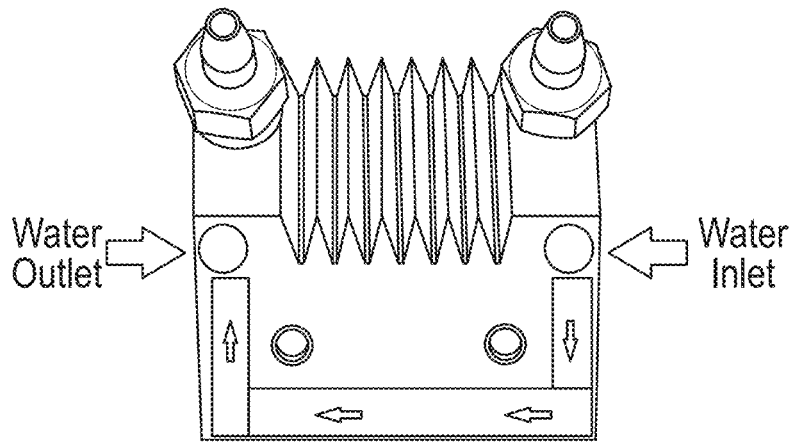
FIG. 42 illustrates the concept of a coolant channel that circumnavigates the trajectory of ultrasonic waves from the PAUT transducer.

FIG. 41 shows a wedge according to some additional embodiments of the invention. As shown in FIG. 41, the wedge according to some embodiments includes a plurality of threaded holes on each side for mounting the wedge to the guide. FIG. 42 illustrates the path of the coolant channel that circumnavigates the PAUT transducer. The design of the coolant path is constrained by a number of requirements. For example, it must allow for sufficient coolant flow to maintain the working temperature of the transducer. The channel is designed to be in close proximity with the transducer without obstructing the ultrasonic waves emitted from and detected by the transducer. To achieve address these constraints, the coolant flow path is configured in a way to flow around a circumference of the transducer. This design provides the closest proximity of the coolant to the transducer, avoids the coolant coming too close to the work surface where it could pick up heat, and avoids the path of the ultrasonic waves.

Automatic Control Feedback System

Figure 9:
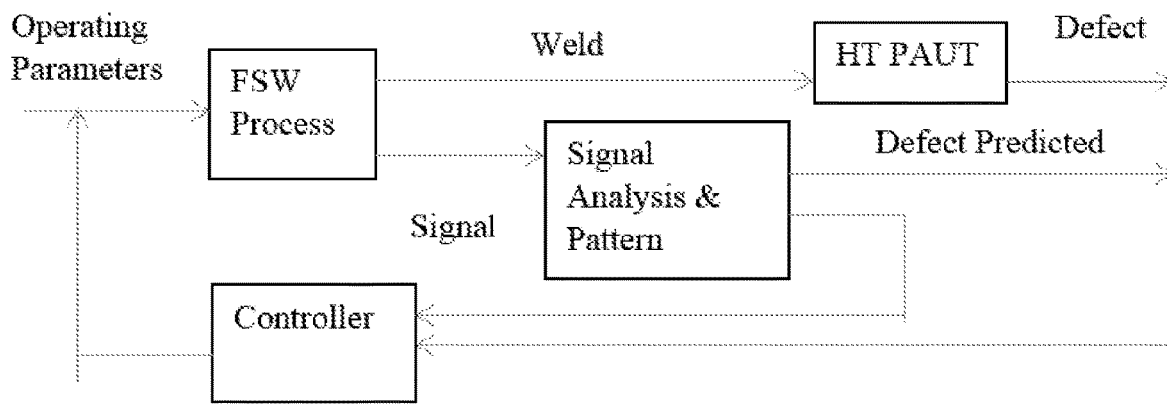
FIG. 9 shows a real time friction stir welding feedback control system according to some embodiments.

The real time friction stir welding feedback control system according to some embodiments is illustrated in FIG. 9. The control system may be implemented by a data processing system in communication with an automatic feedback control system. The data processing system may be communication with the phased array ultrasonic transducer, and may be configured to receive signals from the phased array ultrasonic transducer and process the signals to form an A-scan. The data processing system may also be configured to process the signals received from the phased array ultrasonic transducer to form an S-scan. The data processing system according to some embodiments is configured to process the S-scan to autonomously detect flaws and provide flaw detection information to an automatic feedback control system. The automatic feedback control system commands weld process parameters based on the flaw detection information. The data processing system and the automatic feedback control system can be dedicated "hard-wired" devices, or they can be programmable devices. For example, they can be, but are not limited to, a personal computer, a work station, or any other suitable electronic device for the particular application. In some embodiments, they can be integrated into a unit or they can be attachable, remote, and/or distributed.

The high temperature phased array ultrasonic technique (HT PAUT) allows the detection of weld defects right after welds are made. A controller can be built to adjust operating parameters to avoid making defective welds continuously. Building this controller requires insights about how defects are generated and how process parameters can be manipulated to rectify the problems.

The high temperature phase array ultrasonic technique (HT PAUT) allows the detection of weld defects right after welds are made. A controller adjusts operating parameters to avoid making defective welds continuously. The configuration of the controller utilizes insights about how defects are generated and how process parameters can be manipulated to rectify the problems.

To enable even earlier detection of weld defects, signals collected during friction stir welding processes can be processed and a prediction of weld defects can then be made. To increase the robustness of the prediction model, and hence the feedback control system, the actual defect detected by HT PAUT can be used to refine the prediction model. The model refinement mechanism can be applied whenever needed. Once the prediction accuracy is high enough, then control actions can be triggered based only on the predicted defects. Otherwise, the control actions may be triggered by defects detected by HT PAUT.

For FSW, there are three important parameters depending on the machine. For depth control, parameters include depth, spindle speed, and welding speed (traveling speed). For load control, parameters include z_force, spindle speed, and welding speed (traveling speed). The system can choose which parameters to manipulate based on characteristics of the weld and any observed defects in the weld. Additional factors such as force, temperature, and power can also be collected and used in the analysis of the weld and possible adjustment of parameters. The system and methods can be applied to many different welding applications, and are not limited to FSW. For example, the system and methods can be used to inspect welds during pipe welding, as well as in other industries that would benefit from HT and/or on-line inspection of welds.

[1] A. a. S. L., *Flaws in Friction Stir Welds, in 4th international symposium on Friction Stir Welding*. 2003: Park City, Utah, USA. p. 14-16.

[2] Ditchburn, R. J., S. K. Burke, and C. M. Scala, *NDT of welds: State of the art*. Ndt & E International, 1996. 29(2): p. 111-117.

[3] Choqueuse, D. and A. Lamarre, *Use of Phased Array Ultrasonic Equipment For Fatigue Crack Characterization For Underwater Inspection of Offshore Structures*. International Society of Offshore and Polar Engineers.

[4] Crowther, P., *Practical experience of phased array technology for power station applications*. Insight-Non-Destructive Testing and Condition Monitoring, 2004. 46(9): p. 525-528.

[5] Birks, A. S., R. E. J. Green, and P. McIntire, *Nondestructive Testing Handbook*. 2 ed. Vol. 7. 1991, Columbus, Ohio: American Society for Nondestructive Testing.

[6] Li, B., Shen, Y., Hu, W., *The study on defects in aluminum 2219-T6 thick butt friction stir welds with the application of multiple non-destructive testing methods*. Materials & Design, 2011. 32(4): p. 2073-2084.

[7] Dewan, M. W., J. Liang, M. A. Wahab, and A. M. Okeil, *Effect of post-weld heat treatment and electrolytic plasma processing on tungsten inert gas welded AISI 4140 alloy steel*. Materials and Design, 2014. 54: p. 6-13.

[8] ASTM-E2491, *Standard Guide for Evaluating Performance Characteristics of Phased-Array Ultrasonic Testing Instruments and Systems*. 2008, ASTM International: West Conshohocken, Pa.

[9] Olympus-NDT, *Advances in Phased Array Ultrasonic Technology Applications*, ed. Michael; and D. C. Moles. 2007, Waltham, Mass., USA: Olympus NDT.

[10] *Fundamentals of Ultrasonic Phased Arrays [electronic resource]*. Springer International Publishing.

[11] Schmmer Jr, L. W., *Fundamentals of Ultrasonic Phased Arrays*. Modern Physics Letters B, 2008. 22(11): p. 917-921.

[12] Corporation, O. *Flaw Detectors OmniScan MX2*. Available from: http://www.olympus-ims.com/en/onmiscan-mx2/.

[13] Kirk, K. J., A. McNab, A. Cochran, I. Hall, and G. Hayward, *Ultrasonic arrays for monitoring cracks in an industrial plant at high temperatures*. Ieee Transactions on Ultrasonics Ferroelectrics and Frequency Control, 1999. 46(2): p. 311-319.

[14] Subbaratnam, R., S. T. Abraham, M. Menaka, B. Venkatraman, and B. Raj, *Time of Flight Diffraction Testing of Austenitic Stainless Steel Weldments at Elevated Temperatures*. Materials Evaluation, 2008. 66(3): p. 332-337.

[15] Johnson, W., F. Mauer, D. Pitchure, S. J. Norton, Y. Grinberg, and F. Bendec, *Temperature and Annealing Dependence of the Longitudinal Ultrasonic Velocity in Aluminum-Alloys*. Journal of Materials Research, 1993. 8(7): p. 1558-1566.

[17] Tariq, F., N. Naz, R. A. Baloch, and Faisal, *Characterization of Material Properties of 2xxx Series Al-Alloys by Non Destructive Testing Techniques*. Journal of Nondestructive Evaluation, 2012. 31(1): p. 17-33.

[18] Oberg, E., Jones, F., Horton, H., Ryffel, H., *Temper Designations for Aluminum Alloys, in Machinery's Handbook (29th Edition) & Guide to Machinery's Handbook*. Industrial Press.

The following examples describe some embodiments in more detail. The broad concepts of the current invention are not intended to be limited to the particular examples. Further, concepts from each example are not limited to that example, but may be combined with other embodiments of the system.

EXAMPLES

Non-destructive evaluation (NDE) techniques of phased array ultrasonic testing (PAUT) and digital x-ray radiography were employed on friction stir (FS) welded Aluminum Alloy (AA) 2219-T87 specimens. PAUT intricacies are discussed which are required for scanning of FS welded specimens with a 10 MHz 32-element transducer. The "time corrected gain" (TCG) calibration is required for scanning with an increase in index offset to compensate for decrease in A-Scan signal peak amplitude. Calibration techniques to find small defects with appropriate size tolerances are also established. The NDE technique of digital X-ray radiography is compared to PAUT where it was found that a calibrated PAUT system is able to discover defects less than 0.2 mm where X-ray radiography could not. Incomplete penetration (IP), wormhole (WH), surface cavity (SC), and internal void (IV) defects are analyzed. Furthermore, an on-line PAUT system for FSW has been developed and successfully tested. The on-line PAUT provided herein can be utilized as part of an automated PAUT on-line sensing system.

Welding technology has evolved in the recent decade with the introduction of Friction Stir Welding (FSW). As a solid state welding process, it has become increasingly popular with government research organizations and private sectors, specifically in the welding of aluminum alloys (AA) for aerospace applications. Formerly, fusion welding was the most prevalent process in the aerospace industry; however, fusion welding of aluminum caused defects such as porosity, weld metal solidification cracking, and heat-affected liquation cracking. FSW is now the leading technique that has overcome the problems of porosity and hot-cracking encountered in fusion welding of AA [1]. Nevertheless, even with these desirable qualities, fundamentally with any welding technique welding defects will occur if conducted indecorously. For this reason, nondestructive inspection techniques are always employed post-weld to determine weld defects [2].

Two major post-weld non-destructive evaluation (NDE) techniques are X-ray radiography and phased array ultrasonic testing (PAUT). These NDE techniques are required to have high reliability and accurate defect-sizing capabilities [2] in order to successfully evaluate welded structures, especially in the aerospace industry. Another emerging technology that is being evaluated for post-weld inspection on FS welds is the Eddy current technique [3-11]. In ultrasonic testing, ultrasonic waves are scattered by planar and volumetric defects. Partially closed cracks are also detectable by ultrasonics, provided that appropriate procedures are used [12]. Alternatively, X-ray radiography utilizes a radioactive source that emits X-rays onto a specimen. A X-ray image created depends on the degree of penetration from the high energy wave. X-ray radiography offers a fast and permanent defect image; however, the process requires access to both sides of the evaluated part, and more importantly poses health issues which require the area near the test-location to be quarantined. Due to these inherent limitations, ultrasonic testing has been the preferred method over X-ray radiography for general post-weld inspections [2].

As technology for ultrasonic testing has improved, PAUT has replaced the conventional ultrasonic methods as well as other non-destructive testing (NDT) techniques in many post-weld evaluation applications [13-17]. PAUT offers increased inspection sensitivity and coverage as well as decreased inspection times. Phased array ultrasonic probes utilize an array of piezoelectric elements which generate sound waves, typically in the MHz region. The sound waves, based upon the firing sequence of the piezoelectric elements, form a wave front that is characterized by Huygen's interference patterns [18, 19]. The sound waves are predictable due to classical physics phenomena and have been well documented as they pertain to ultrasonics [20-28].

PAUT allows the operator to better determine the size, shape, and orientation of a defect versus traditional pulse echo techniques [29-31]. Even though this technology is applied quite extensively, there is little documentation of the intricate details needed to accurately operate a PAUT system to precisely determine the size and location of a defect, especially in FS welds. Schneider et al. [16] conducted an extensive study comparing operators of PAUT and conventional UT. The study concludes that there is variability in the ability of PAUT operators' flaw sizing; consequently, it is recommended that adequate training is employed for PAUT operators. There are three levels of certification of non-destructive testing (NDT) methods including level I, level II, and level III. NDT training is based upon the NDT Body of Knowledge (BOK) and can be found in the ANSI/ASNT American National Standard CP-105, ASNT Standard Topical Outlines for Qualification of Nondestructive Testing Personnel.

The only paper in the open literature that compares the performances of two most common NDT techniques including x-ray radiography and PAUT in detecting defective FS welds is Li et al. [30]. However, only limited information was given pertaining to the capabilities of PAUT and X-ray radiography in detecting various forms of defects. In another study [6], several NDT techniques including conventional and pulsed eddy current testing, laser generated and phased array ultrasonic testing are compared in inspection of incomplete penetration discontinuities in FS butt welds.

Comparisons of the two most common NDT techniques (i.e. PAUT and X-ray radiography) in detecting various forms of FS weld defects are described belo. PAUT has not been used in an integrated on-line manufacturing process which requires operating PAUT in high temperature environments, which has not been previously accomplished. There are many challenges in creating this system due to the damage that may incur to the sensitive piezoelectric elements. A PAUT system to evaluate FS welds on-line is described below.

Described herein are (1) details of PAUT including calibration techniques, index offset considerations, and defect-size limitations pertaining to FSW, (2) a more extensive study comparing the performances of PAUT and X-ray radiography in detecting various forms of defective FS welds, and (3) a system design for employing PAUT on-line for detecting defective welds.

PAUT and FSW Experiments

Through an extensive study conducted at the NASA Michoud Assembly Facility in New Orleans, La., aluminum alloy panels were FS welded in a typical butt-joint configuration [32]. The welded specimens from that study were thereby utilized for all PAUT experiments. Through the course of the work, an OmniScan MX2 data acquisition unit [33] was utilized with a 10 MHz 32-element transducer. In the literature, PAUT has been applied to detect flaws in FS welds after welding; however, details regarding calibration and other settings are often left out [11, 19, 20]. In this work, a detailed analysis of these techniques was conducted to determine the best practices for utilizing PAUT on FS welds, with a mind set to scan real-time during welding. Consequently, the transducer was tested for accuracy, defect size limitations, gain effect on A-scan amplitude for various defect sizes, and specific FS weld configuration limitations. Aside from employing typical calibration procedures for PAUT systems including sensitivity, velocity, and wedge, the time corrected gain (TCG) calibration was as well utilized.

Figure 10:
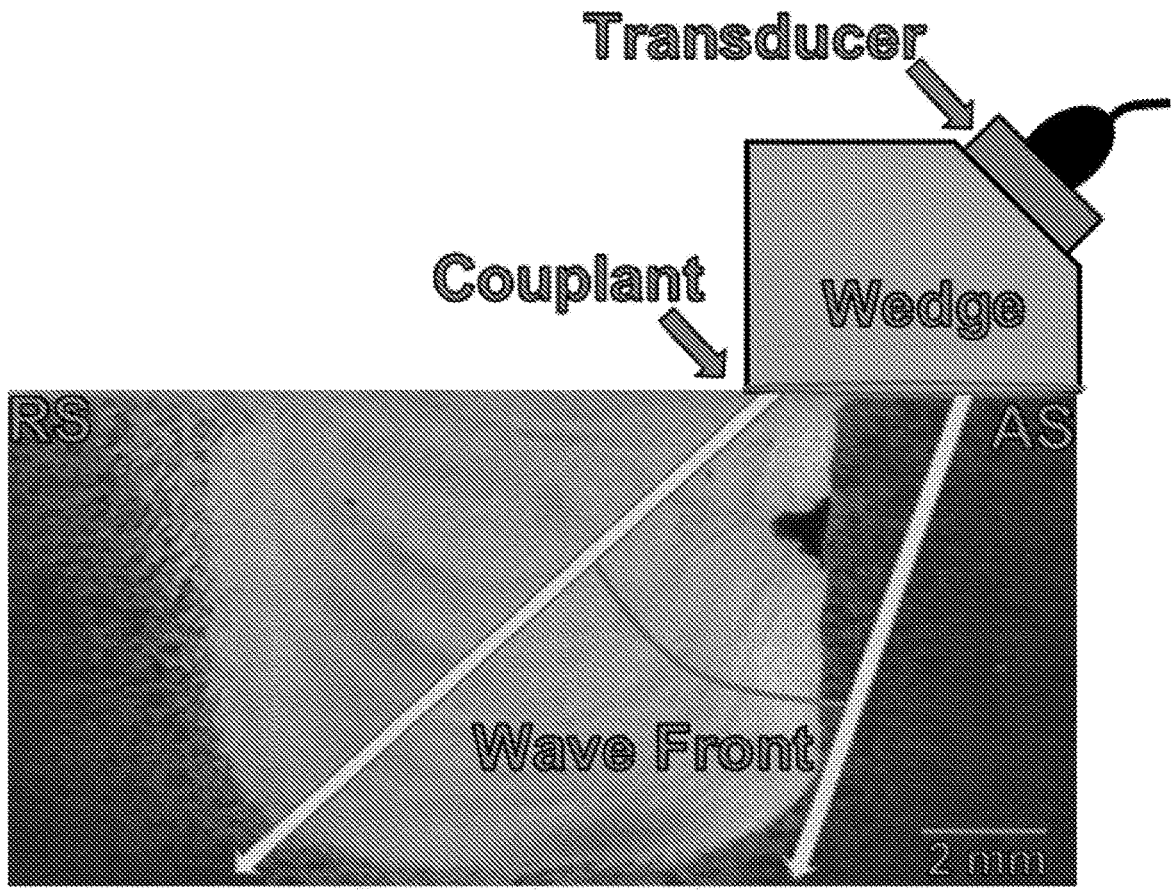
FIG. 10 shows a probe and wedge configuration with illustration of wave propagation inside an FS welded specimen.

In FSW, there are two sides of a welded specimen which are distinctively different from one another, called Advancing and Retreating. Each side of a FS weld has specific properties based upon material flow due to the rotation of the pin. Through this work, scanning of FS welded panels was conducted by placing the PAUT probe/wedge unit on the advancing side (AS) of the FS weld, as seen in FIG. 10. As defects in FSW typically form on the AS, the wedge/transducer unit was thereby placed on that side. This allows defect signals to be closer to the wedge causing less divergence of the sound waves, and thus more accurate data was obtained.

During welding, material expulsion out of the weld seam (considered flash) can occur. The expulsion of material typically occurs on the retreating side (RS), and to avoid flash contact with the wedge the AS was deemed more suitable for placement. Because the system is designed to scan FS welds on-line, index offset is particularly important. As the FSW process generates ripple patterns on the surface of the welded area, PAUT cannot scan on-top or near the weld center line without post-processing. By utilizing correct index offset processes, scanning may be accomplished without post-processing of the welded seam. Through the course of the work, the PAUT system was calibrated to be 20 mm away from the weld center line.

Figure 11:
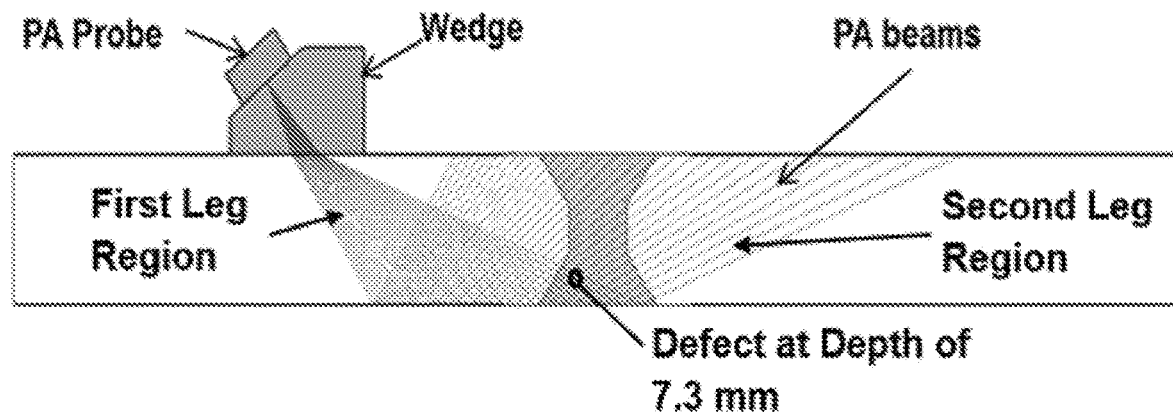
FIG. 11 shows a schematic of first and second legs with an SDH defect.

An important consideration for on-line inspection is the ability to decipher the scan images produced by, for example, an OmniScan system. For S-scan images, PAUT software utilizes a mirroring image technique when multiple legs (nomenclature for wave reflections by the walls of the specimen, See FIGS. 12 and 30) are viewed. Sound waves which are not reflected by the defect will travel farther, and thereafter will be reflected by the back-wall of the work piece. Utilizing multiple legs allows the scan images to illustrate waves that travel farther than the initial thickness of the work piece. With 2-legs, waves travel twice the thickness of the material. This feature is very important as index offset is utilized herein. An illustration of the inverting (mirror) image technique in the data acquisition unit with first and second leg sound waves can be seen in FIG. 1. FIG. 11 shows a schematic of first and second legs with an SDH defect.

It can be seen that the initial defect image is at a depth of 7.3 mm in FIG. 1. An apparent second defect at a distance of 9.4 mm is also observed. The second defect image is located at a distance that exceeds the thickness of the work piece (8.32 mm thickness for this experiment). The defect's actual depth is evaluated by the operator taking the difference of the depth given from the image and work piece thickness. The resulting value is then subtracted from the work piece thickness, which is the location similar to the first leg defect depth. In summary, due to the many elements in a PAUT transducer, signals emitted from certain elements may not be influenced by a defect; consequently, the first leg signals from those elements have not been redirected. These signals are then reflected off the bottom surface of the specimen which re-directs the signal that results in reflecting off the defect. This is illustrated in FIG. 11 for the defect at the larger depth.

PAUT Vs. X-Ray Radiography for Post-Weld Inspection

A comparison of the abilities of PAUT and X-ray radiography to detect various forms and sizes of defects in weldments has been carried out and is described herein. The FS welded plates were analyzed employing PAUT and compared with X-ray radiography to illustrate sizing capabilities when utilizing a calibrated PAUT system (note the x-ray images below are inverted for better quality). These FS welds were executed utilizing varying weld schedule parameters (plunge or forge force, travel speed, and spindle speed).

Figure 12:
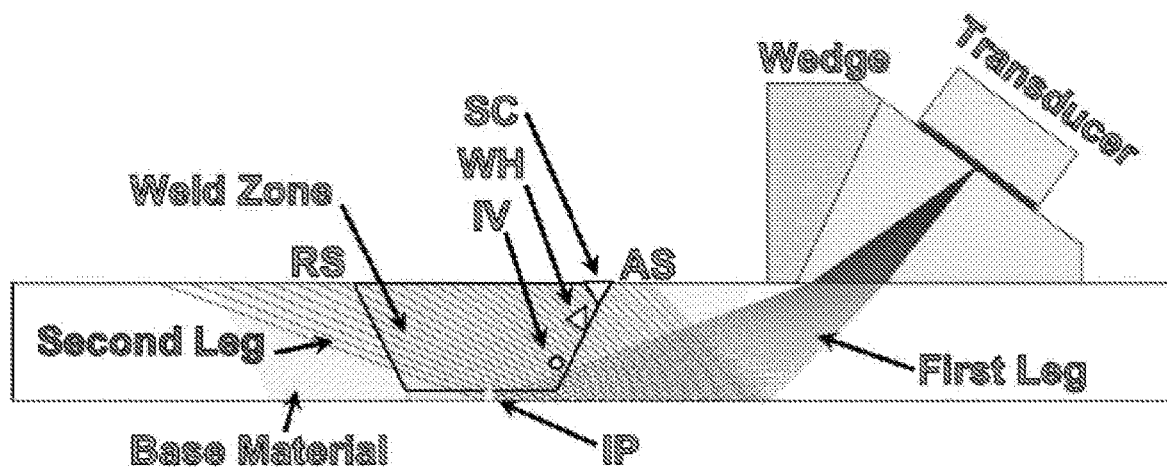
FIG. 12 is an illustration of a PAUT system with various legs indicating where FSW defects may occur.

Weld schedules were designed in a way to purposely produce defects. Four defect types are presented below. Defects presented in this study include surface cavities (SC), wormhole (WH), internal voids (IV), and incomplete penetration (IP). SCs are surface defects whereas WH and IV are internal defects. IP is a defect located at the root of a weld caused by unconsolidated material on the seam line. Each defect type has a different formation mechanism and is directly related to the process parameters utilized during welding. Firstly, a SC formed by lack of material in the weld seam during plunge stage of a FSW is presented. Secondly a WH defect is presented followed by another SC, often considered a trenching (TR) defect, is shown. Thereafter, an IV is shown. Lastly, IP defects are described. The typical defect location of each defect in FSW is shown in FIG. 12 with anticipated legs which will find the defects.

Figure 13:
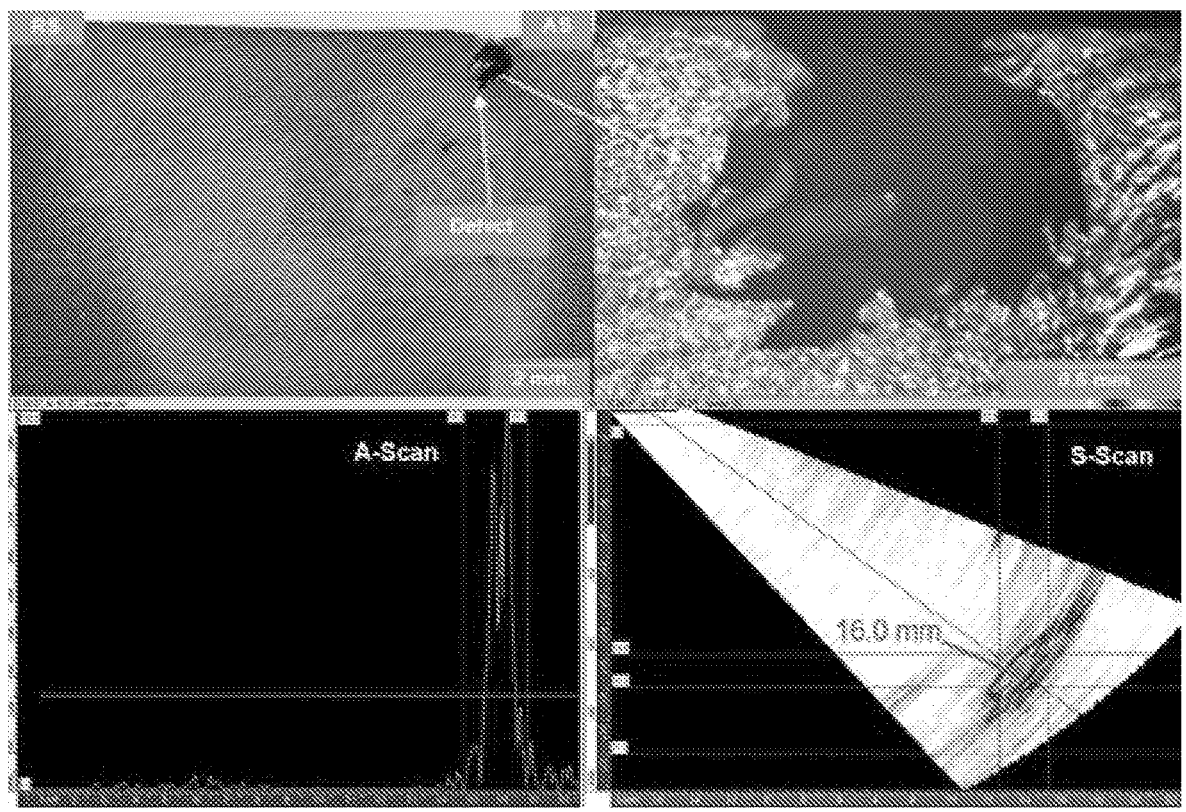
FIG. 13 shows an optical image of a cross-section, an enlarged defect image, a PAUT A-Scan image, and a PAUT S-Scan image (second leg) of an FS welded panel with a surface cavity (observed by the second leg)

FIG. 13 illustrates a FS weld that has incurred a large defect located on the AS of the weld. A-scan image can be seen with associated S-scan image. The S-scan image depicts a snapshot of the defect with accurate estimates of its size and location. It is observed that the defect is found by second leg signals, as the depth of the defect is greater than the workpiece thickness, i.e., 8.32 mm, and less than doubled thickness, i.e., 16.64 mm.

Figure 14:
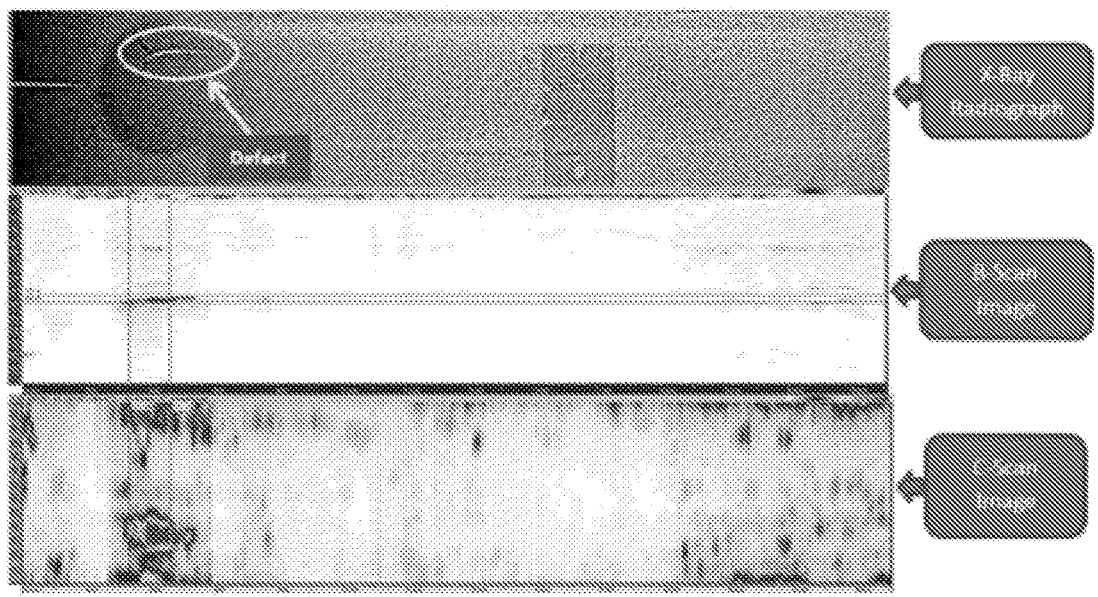
FIG. 14 shows a radiographic image, a PAUT B-Scan image, and a PAUT C-Scan image of an FS welded panel with a surface defect.
Figure 15:
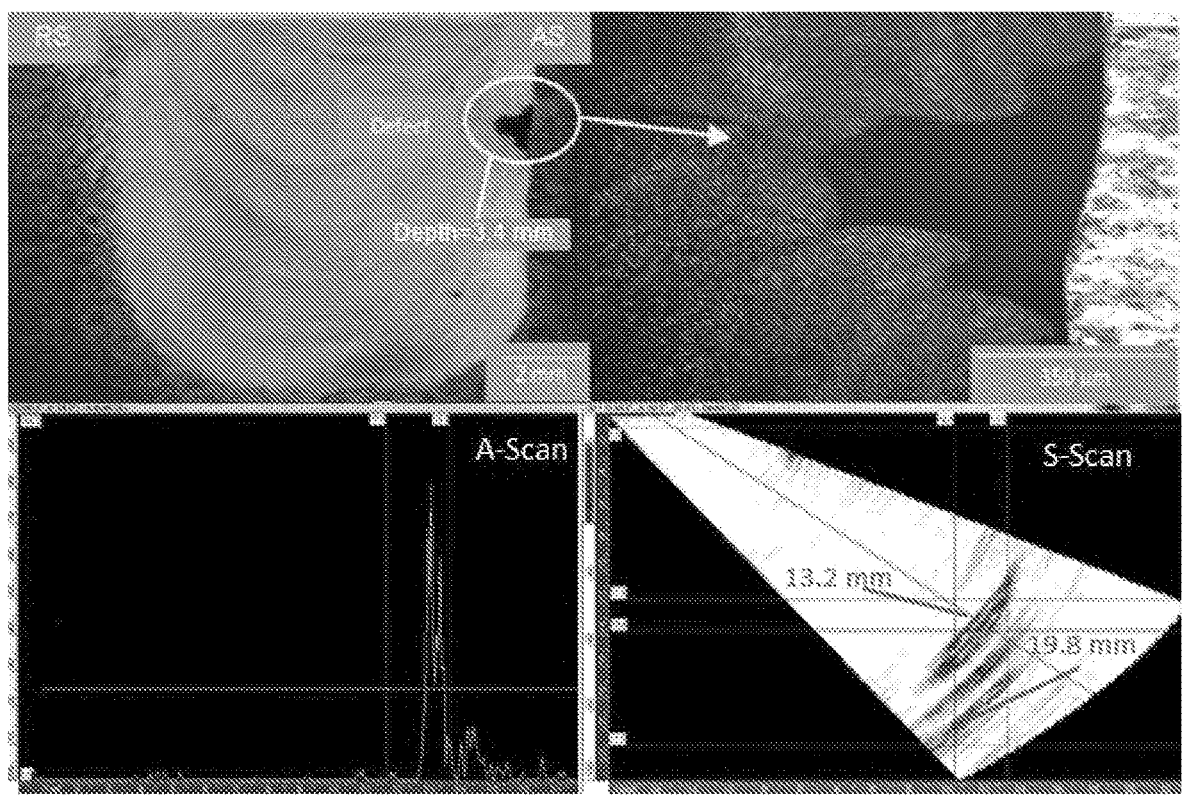
FIG. 15 shows an optical image of a cross-section, an enlarged defect image, a PAUT A-Scan image, and an S-Scan image of an FS welded panel with a wormhole defect (observed by the second and third leg)
Figure 16:
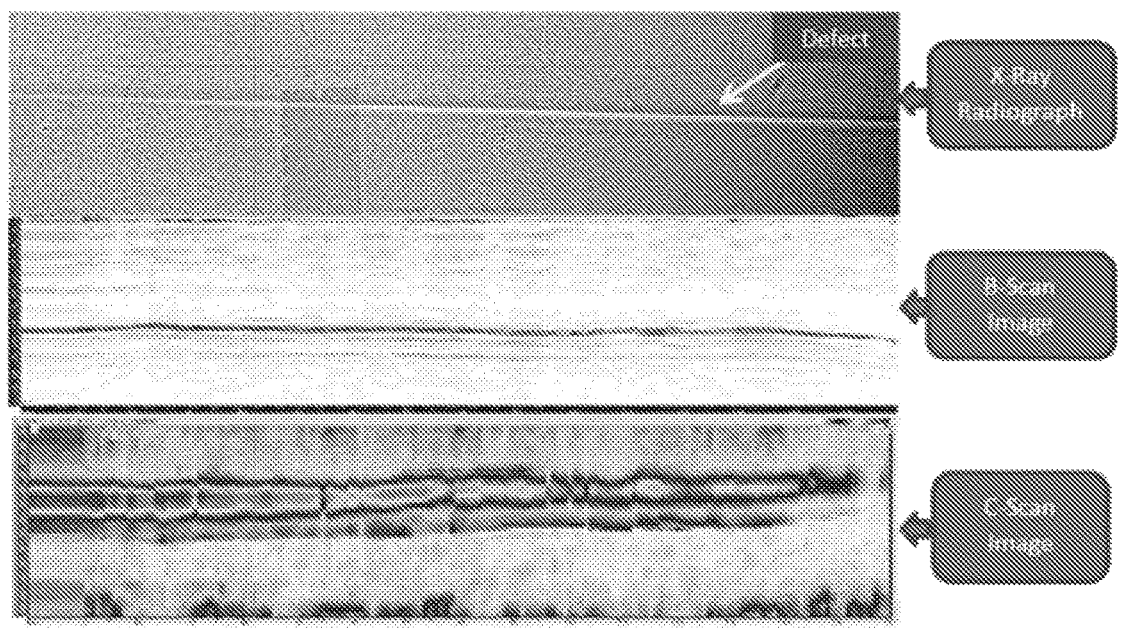
FIG. 16 shows an x-ray radiograph image, a PAUT B-Scan image, and a PAUT C-Scan image of an FS welded panel with a wormhole defect.
Figure 17:
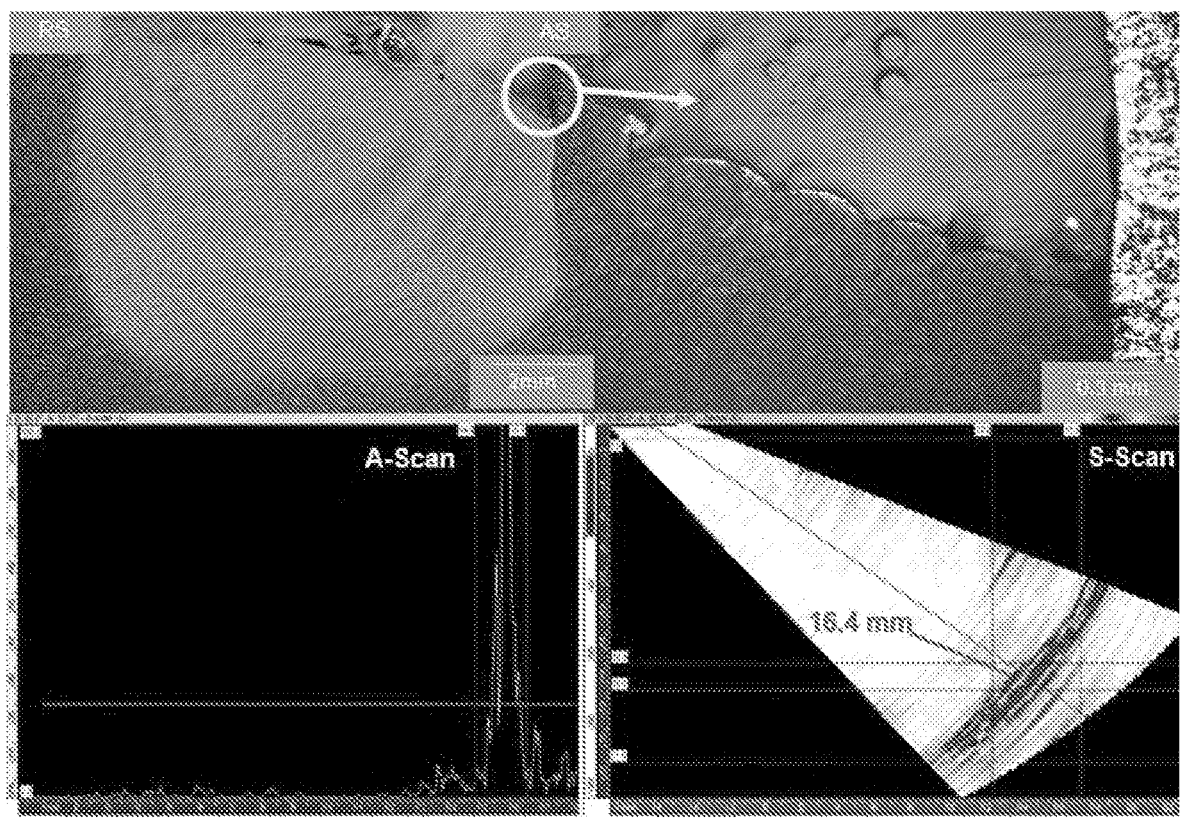
FIG. 17 shows an optical image of a cross-section, an enlarged defect image, a PAUT A-Scan image, and an S-Scan image of an FS welded panel with an SC defect (observed by the second leg)
Figure 18:
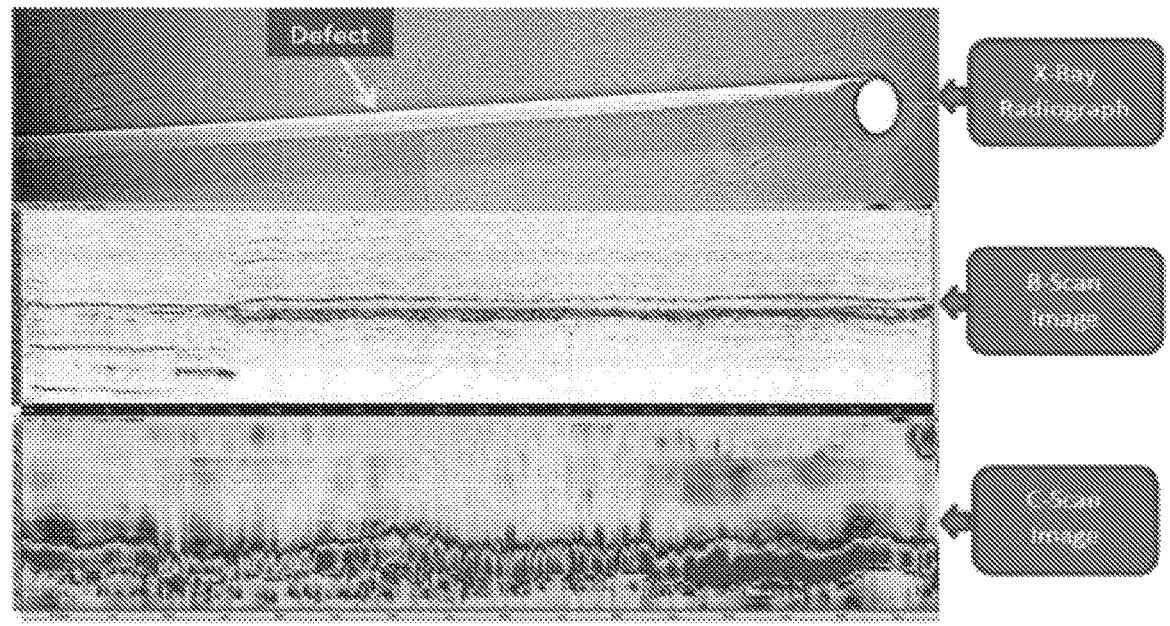
FIG. 18 shows an x-ray radiograph image, a PAUT B-Scan image, and a PAUT C-Scan image of an FS welded panel with an SC defect.

FIG. 14 illustrates a representation of an X-ray image compared with a B-scan and a C-scan of the PAUT system. Furthermore, in FIGS. 15 and 16 a WH defect is shown. In a similar fashion, a SC defect is presented in FIGS. 17 and 18. These defects were as well detected by the second leg signals, as the wedge/transducer system is not scanning near or on-top of the defect. In FIG. 15, it is noted that the WH was also found by third leg signals, as the defects depth is greater than 16.64 and less than 24.96 mm. It can be seen that as the signal propagates further through the specimen, the defect depth has larger error. These defects were found accurately with X-ray radiography and PAUT. Note there was no post-processing of the panels for these tests. The X-ray image compares very well with PAUT scans and shows that the two NDE techniques correlate very well for large defects, which is expected; however, it can be said that defects of this size and shape will most likely not occur in the production line.

Figure 19:
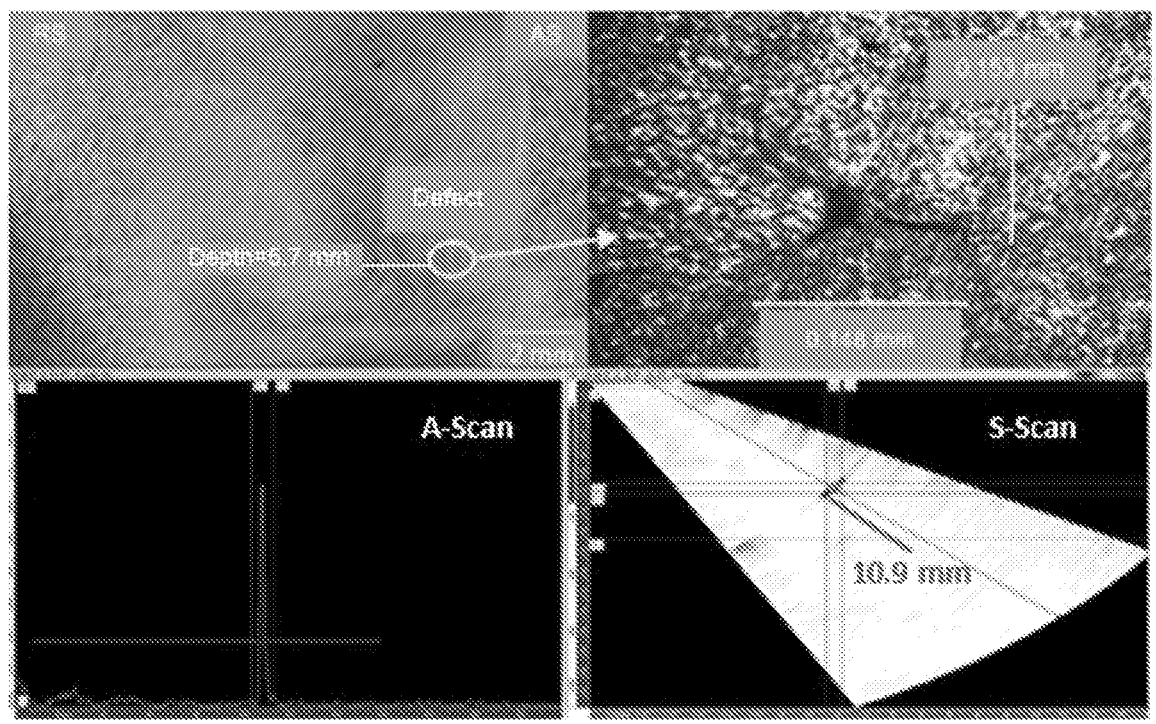
FIG. 19 shows an optical image of a cross-section, an enlarged defect image, a PAUT A-Scan image, and an S-Scan image of an FS welded panel with an internal void (observed by the second leg)
Figure 20:
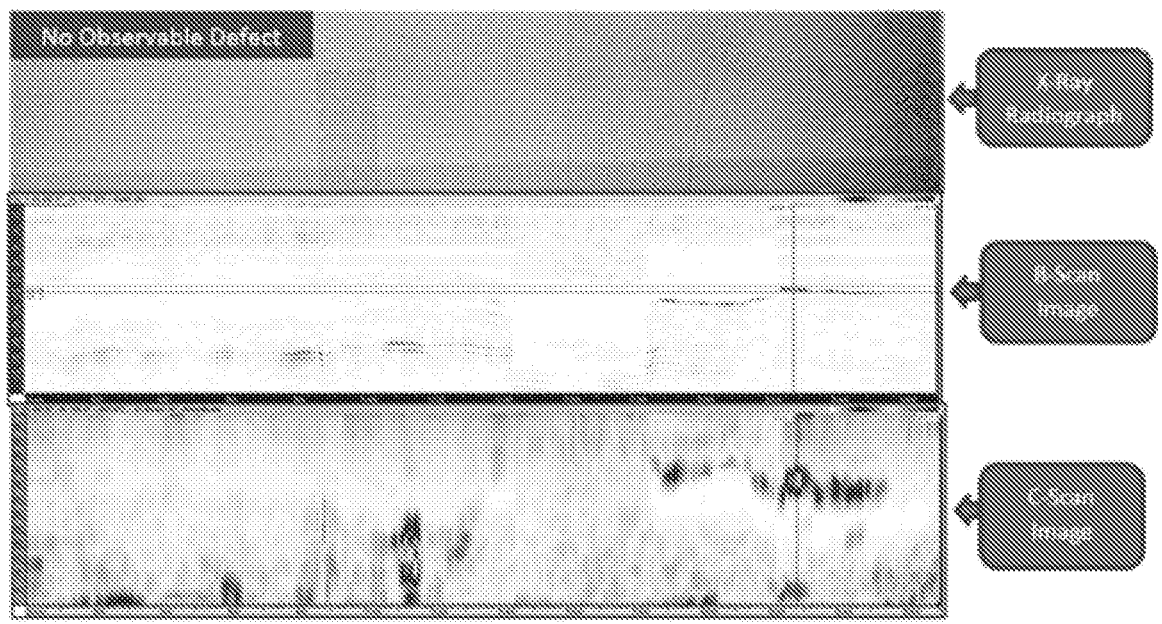
FIG. 20 shows an x-ray radiograph image, a PAUT B-Scan image, and a PAUT C-Scan image of an FS welded panel with an internal void.

An internal void defect is shown in FIGS. 19 and 20. In this FS weld, two defects were found by the PAUT system; however, both defects were not found by x-ray radiography. The smaller defect on the right in FIG. 20 is analyzed here. The defect was measured to be in the range of 0.15 mm in length and height. It is seen that the A-scan amplitude does not reach 80% due to calibrating the system with a larger defect size. The intensity of the reflected sound wave decreased giving maximum amplitude of ≈68%. It is observed that the X-ray image does not detect the small defect.

One challenging defect for NDE techniques to observe is IP. As this defect can be detrimental for industrial applications, many studies have analyzed said defects for all major welding processes; however, few pertaining to IP for FSW by employing ultrasonic techniques can be found in the open literature. Lamarre et at. [34] employed a triple NDT approach including ultrasonic pulse echoes, ultrasonic attenuation measurements, and eddy currents to analyze FS welded specimens. It is stated that the triple NDT technique detects FSW defects including KBs (IP defects). Alternatively, it was shown that ultrasonic C-scan images are difficult to observe IP; however, utilizing a noise ratio of parent and weld material a better indication of IP can be obtained. A high noise ratio indicates that a kissing bond is present.

Mandache et al. [6] compared multiple NDE techniques (pulsed eddy current, conventional eddy current, PAUT, laser generated ultrasonic waves with synthetic aperture focusing technique (SAFT), liquid die penetrant) to analyze IP defects where a retractable pin tool was employed to vary the depth of penetration on a 2.56 mm thick panel. Employing a 10 MHz-16 element probe, it was possible to detect IP defects with lengths greater than 0.2 mm from the root of the weld. In their study however, post-processing of FS welded specimens was conducted, whereas in our study no post-processing was carried out in order to correlate with on-line scanning. Bird et al. [35] developed a method to determine the forging depth of FS welds by material noise ratio analysis which was able to measure penetration better than 0.5 mm. Furthermore, in that study it was stated that employing ultrasonic amplitude rejection for conventional defects, it was possible to discover voids with a through wall size of 0.1 mm. A study by the same research group of the previous study developed statistical signal processing algorithms [36] which have the ability to identify weld nugget and root. Laser ultrasonics composed of a Nd:YAG laser in conjunction with a photorefractive interferometer was employed in [37] to detect internal defects and residual stresses. It was shown that such system can detect IP defects as well.

Throughout the FS experiments described here, multiple IP defects were found, as can be seen in Table 1. In the present study, X-ray radiography had difficulty in detecting IP defects. Alternatively, PAUT was able to discover IP defects; however, an increase in gain value was needed in order to provide A-scan signal peak amplitude values near acceptable limits with the aforementioned calibration, which originally allowed 80% A-scan peak amplitude for 0.79 mm defects. Even with the increase in gain, the signal to noise ratio of the system was still adequate to accurately observe defects.

A few IP defects could not be discovered by the PAUT system, not because of the length of the defect, but rather due to large defects also present in the same specimen (WH and SC). As the gain values were increased, large wormhole or trench defects caused high noise, and in some cases would distort the location where the IP defect resided. This should not be considered as a limitation on PAUT defect detection capabilities since such work-pieces would be rejected due to the other defects, which are PAUT detectable. However, with the current PAUT calibrated system IP defects with defect height less than 0.3 mm could not be detected.

TABLE 1

Various IP defects with defect height from root of weld
IP Height from Weld Root
[μm]

| |
| --- |
| 614 |
| 965 |
| 480 |
| 901 |
| 753 |
| 332 |
| 433 |
| 757 |
| 454 |
| 963 |

Figure 21:
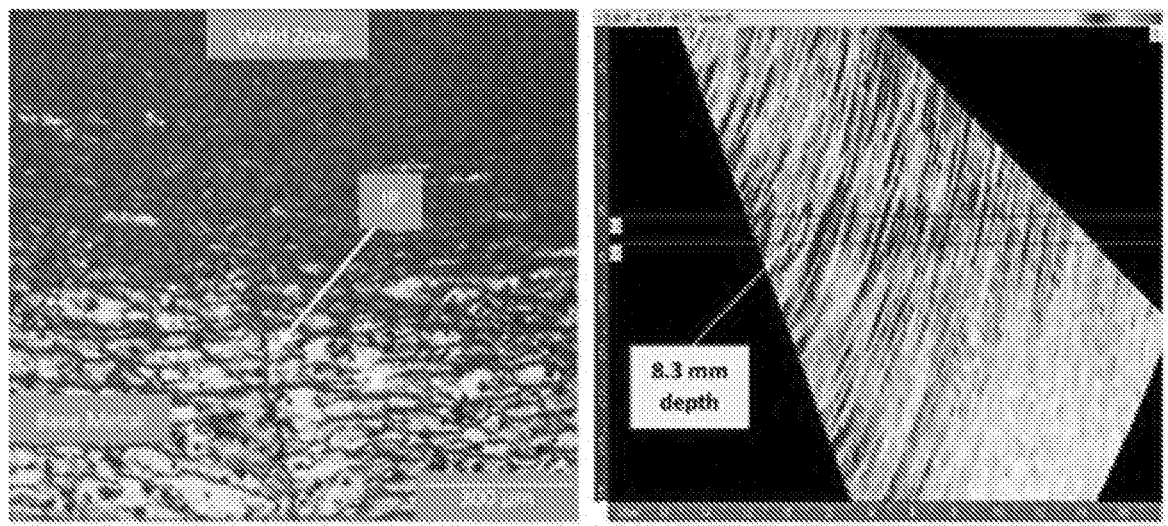
FIG. 21 shows an optical image (left) of an IP defect of length 480 µm and an associated S-scan image (right) of the IP defect.
Figure 22:
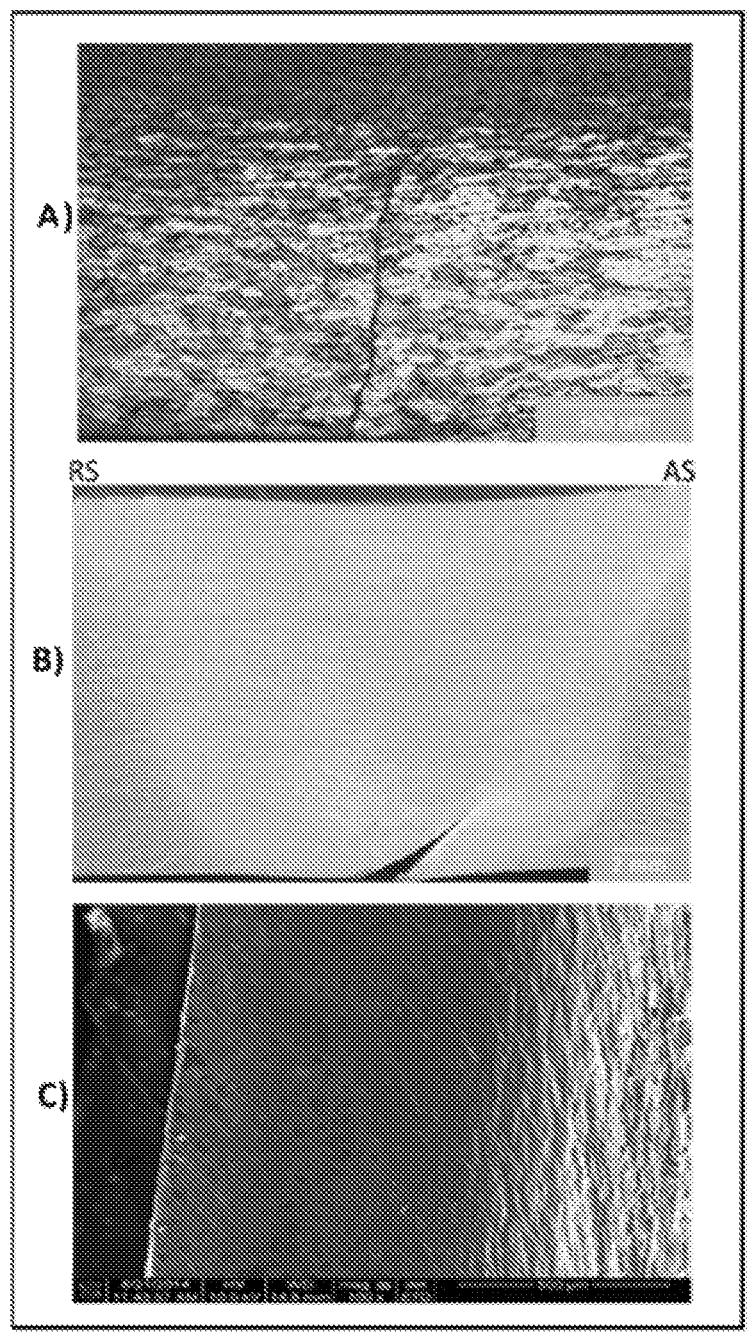
FIG. 22 shows A) a optical micrograph of IP defect, B) an optical image of tensile tested specimen indicating fracture origination, and C) an SEM image indicating an un-bonded area.

To indicate the performance of the PAUT system, a comparison of an S-scan IP image with associated optical micrograph is shown in FIG. 21. The defect size of this specimen is 480 μm, and was found by the PAUT system to have a defect height of 500 μm. PAUT defect height overestimates the actual defect height in most cases due to high gain values implemented in calibration. IP defects were thereafter verified with tensile tests, which were conducted on all specimens welded in this study with an MTS 810 Material Testing System. FIG. 22 illustrates an IP defect with associated fracture origination from tensile test, and scanning electron microscopy (SEM) image of the fracture surface. In the SEM image, it is evident that an un-bonded surface is present by observing a lack of fracture dimples associated with a bonded surface.

On-Line PAUT

An online PAUT system can detect various FSW associated defects in real-time, thus expediting the inspection process and any remedy measures that need to be taken such as adjusting weld schedules. There are many challenges in developing such an online system. This section addresses the major development challenges, high temperature and geometric constraints due to weld fixtures. Finally, a demonstration of the system is presented for some welds.

High Temperature Ultrasonics

It is stated that at high temperatures (approximately greater than 400° C.) linear temperature dependence deviates. Development towards creating a flexible transducer array at 150° C. was conducted in Ref [41]. A study by Tariq et al. [42] examined various AAs including AA-2219 which illuminated that ultrasonic testing can be conducted to correlate hardness values to material velocity and attenuation. The study states that the material velocity of AA-2219 with hardness (HV) of 138 correlates with a longitudinal velocity, with a 4 MHz probe, of 6.354 mm/μs.

Employing the knowledge gained from the post-weld FSW analysis, a method to incorporate FSW working conditions was employed for real time PAUT scanning. Firstly, PAUT transducers are quite sensitive to heat. Typically the elements in a transducer are warranty rated by the manufacturer from 5° C. to 45° C. This is a leading cause why PAUT is seldom employed for high temperature (HT) applications. Consequently, as mentioned in the literature, a change in temperature will cause a change in the ultrasonic velocity which poses issues for accurate defect detection. For this reason, experiments were conducted to determine approximate temperature ranges near the weld seam during FSW tests. K-type thermocouples and infrared imaging techniques were employed and determined a maximum temperature of 312° C. was reached 20 mm away from the weld seam for the welding configuration.

To circumvent these high temperatures in order to prevent damage to the sensitive piezoelectric elements, a wedge was designed by the authors and fabricated from Vespel material (temperature rated: 287.8° C. constant to 482.2° C. intermittent) by Sonatest. As this material is rated near the eutectic melting temperature of binary aluminum-copper alloys (548° C. [43]), this material was deemed suitable for the FSW application. The wedge was further designed with a water inlet and outlet for cooling around the transducer casing to ensure piezoelectric element safety. Furthermore, inlets were inserted to allow a steady flow of couplant to the workpiece during scanning. The wedge according to some embodiments of the invention is shown in FIG. 3. The effectiveness of the newly designed and fabricated wedge was first tested in a laboratory setting for a simulated controlled environment at ambient and elevated temperatures (25.0° C., 100° C., 200° C., and 300° C.). The experiments entailed three trials per temperature, and utilized a different calibration file for each trial. Temperature readings were taken with K-type thermocouples and Midi Logger GL820 acquisition system with a sampling rate of 200 ms. A Thermo-Scientific 2200 Hot Plate was employed to heat the AA-2219-T87 material used for calibration.

Figure 23:
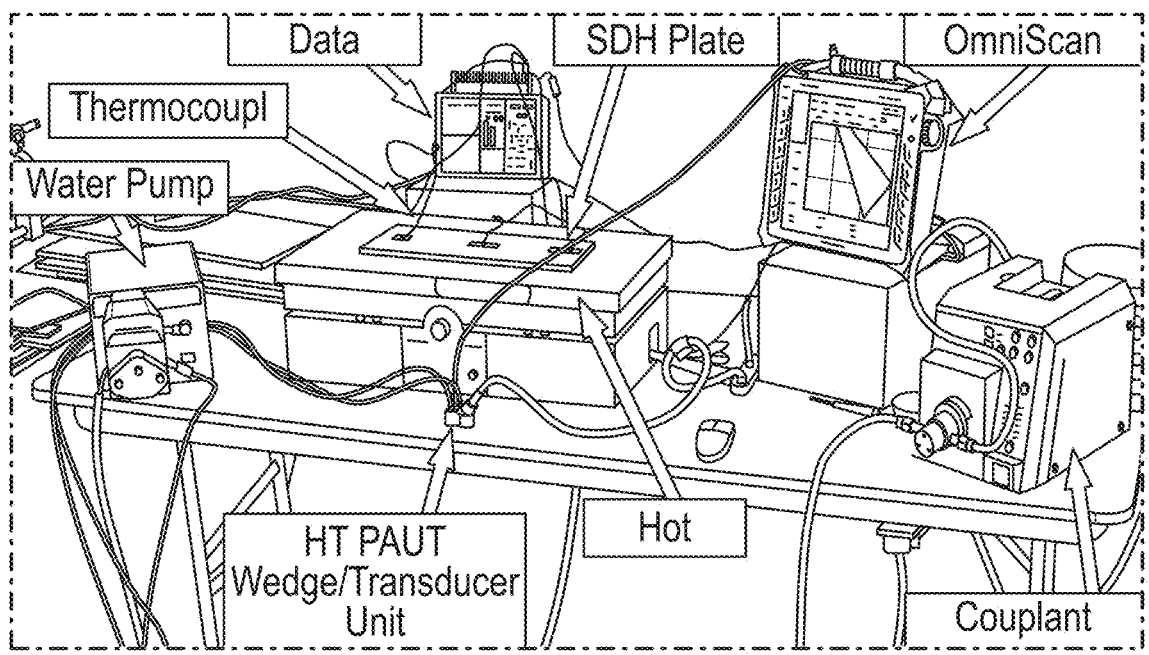
FIG. 23 shows a wedge and PAUT transducer for phased array scanning at high temperature.

In order to pump coolant and couplant through the wedge by the inlets and outlet channel, two Master-Flex pumps were employed. Couplant is required to induce transmission of ultrasonic waves from the wedge to the workpiece, and the coolant is required to maintain a safe operating temperature for the piezoelectric elements in the transducer. FIG. 23 illustrates the experimental setup. According to some embodiments of the invention, the transducer is one of an 10-L32 transducer (10 MHz-32 element), a 5-L32 transducer (5 MHz-32 element), and an A-31 weld series transducer, for example, though the embodiments of the invention are not limited to these transducers. According to some embodiments, a 32-element transducer is used instead of a 64-element transducer in order to reduce the size of the scanning assembly.

Figure 24:
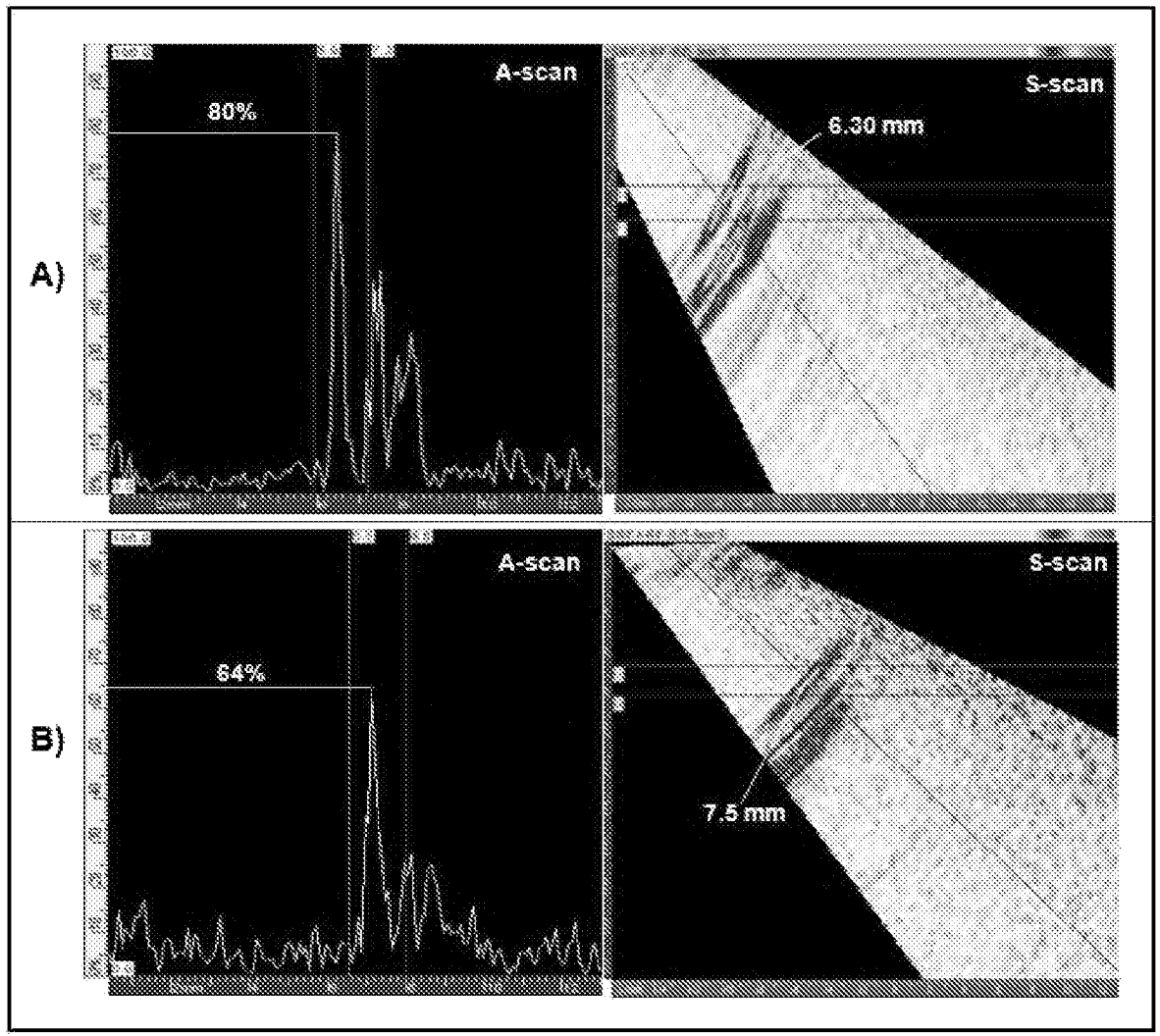
FIG. 24 is a comparison of A- and S-scan images of a 1.19 mm diameter SDH at a depth of 6.3 mm at two different temperatures.

Table 2 summarizes results at ambient conditions. It is observed that with appropriate calibration procedures accurate defect sizing and location was obtained, similar to conventional PAUT wedges. The effects at elevated temperatures can be seen in Table 3. FIG. 24 illustrates two A-scan and S-scan images of a similar defect at A) room temperature and B) 300° C. It was observed that the location of the defect increased in distance as the temperature increased, due to the change in ultrasonic velocity as the material heats. It was observed that at 300° C. the maximum depth change was found to be 1.2 mm. This value appears small, and indicates that at 300° C. there is minimal change for this PAUT configuration. One reason for this small change is the unconventional wedge material that is utilized. According to ASME standard [44] high-temperature materials up to 540° C. can be measured with appropriate HT instruments. For steel, it is claimed that the rule of thumb for apparent thickness measurements with elevated temperatures increases by a factor of 1% per 55° C. An increase in attenuation with the increase in temperature was also observed, from 80% down to 64% A-scan peak amplitude.

Figure 25:
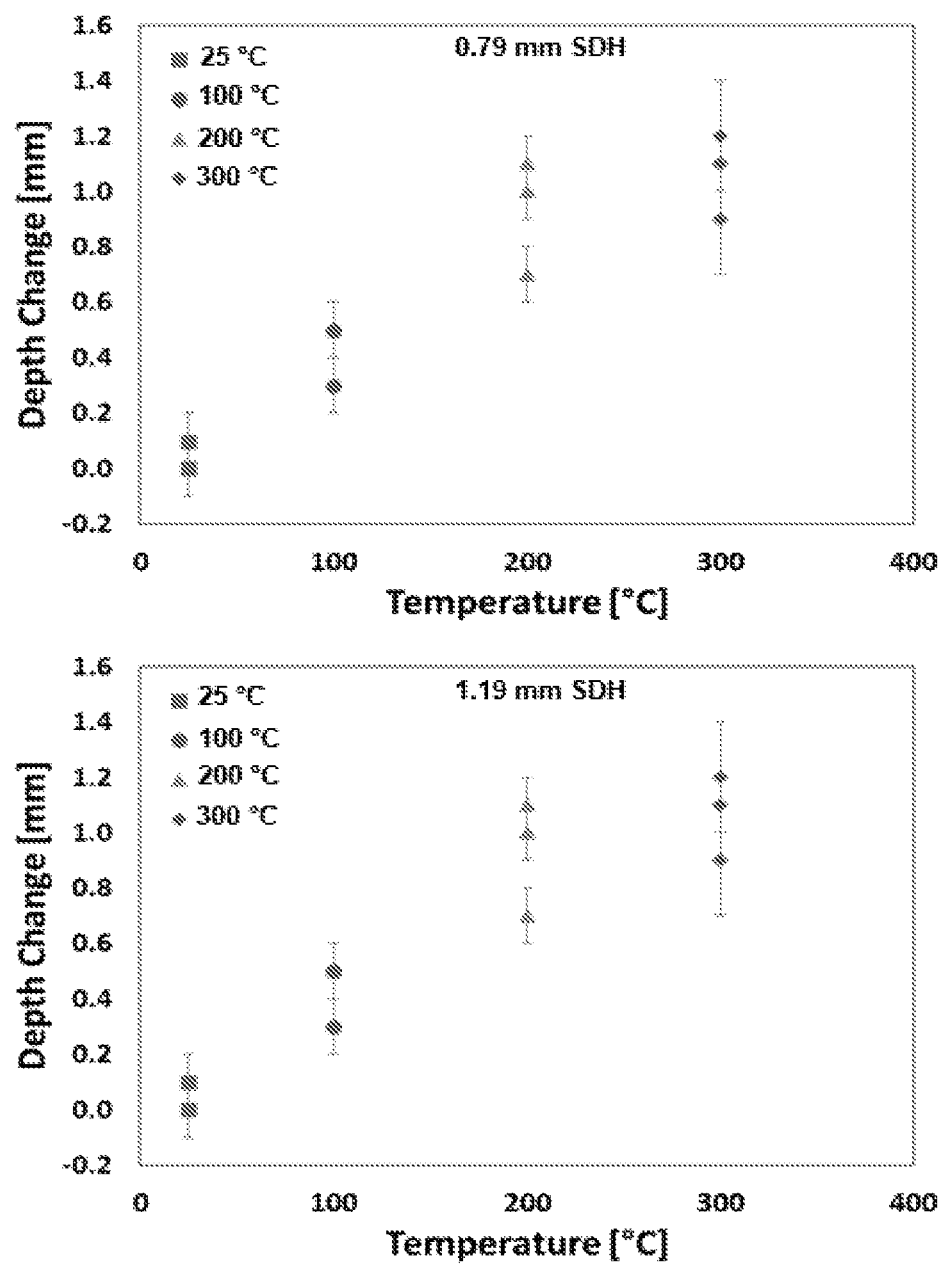
FIG. 25 shows the effect of temperature on defect measurement for HT PAUT system for SDH of diameter 0.79 mm (top) and 1.19 mm (bottom)

A comparison of defect depth variation with temperature is shown in in FIG. 25. At room temperature, error in depth measurement is small compared to when an increase in temperature occurs. With an increase in temperature, defect depth increases. Defect depth measurement variation also increases when the temperature and defect location increases. Furthermore, the attenuation has increased at higher temperatures, which can be observed by the reduction in A-scan peak amplitude. At room temperature 80% A-scan peak amplitude (as calibrated) is obtained whereas at 300° C. a decrease in A-scan peak amplitude is obtained; consequently, the gain value should be increased to compensate for the loss in signal intensity.

When a material's temperature increases, the atoms inside are in an elevated energy state which increases interatomic spacing which impedes transmission. Consequently, at these temperatures a calibration of the software must take place in order to compensate for these high temperatures with a change in material velocity. To improve results, and develop appropriate calibration procedures, corrections are determined experimentally for the material employed.

TABLE 2

Accuracy and Precision of PAUT HT transducer/wedge unit at ambient temperature

| Actual Dia. (mm) | Measured Dia. (mm) | Δ Dia. (mm) | Actual Depth (mm) | Measured Depth (mm) | Δ Depth (mm) |
| --- | --- | --- | --- | --- | --- |
| 1.19 | 1.20 | 0.01 | 2.69 | 2.8 | 0.11 |
|  | 1.20 | 0.01 | 5.15 | 5.3 | 0.15 |
|  | 1.20 | 0.01 | 6.30 | 6.30 | 0.00 |
| 0.79 | 0.90 | 0.11 | 2.83 | 3.00 | 0.17 |
|  | 0.89 | 0.10 | 5.20 | 5.20 | 0.00 |
|  | 0.90 | 0.11 | 7.10 | 7.30 | 0.20 |

TABLE 3

Comparison of two SDHs at increasing temperatures

| Actual Dia. [mm] | Actual Depth [mm] | Temperature [° C.] | Measured Depth [mm] | Measured Dia. [mm] | Δ Depth [mm] | Δ Dia. [mm] |
| --- | --- | --- | --- | --- | --- | --- |
| 0.79 | 2.83 | 100 | 3.50 | 1.10 | 0.67 | 0.31 |
|  | 5.20 |  | 5.70 | 1.30 | 0.50 | 0.51 |
|  | 7.10 |  | 7.60 | 1.40 | 0.50 | 0.61 |
|  | 2.83 | 200 | 3.70 | 1.00 | 0.87 | 0.21 |
|  | 5.20 |  | 5.90 | 1.00 | 0.70 | 0.21 |
|  | 7.10 |  | 8.00 | 1.20 | 0.90 | 0.41 |
|  | 2.83 | 300 | 3.70 | 1.20 | 0.87 | 0.41 |
|  | 5.20 |  | 5.90 | 1.20 | 0.70 | 0.41 |
|  | 7.10 |  | 8.20 | 1.40 | 1.10 | 0.61 |
| 1.19 | 2.69 | 100 | 3.20 | 1.20 | 0.51 | 0.01 |
|  | 5.15 |  | 5.40 | 1.60 | 0.25 | 0.41 |
|  | 6.30 |  | 6.80 | 1.80 | 0.50 | 0.61 |
|  | 2.69 | 200 | 3.70 | 1.30 | 1.01 | 0.11 |
|  | 5.15 |  | 5.80 | 1.40 | 0.65 | 0.21 |
|  | 6.30 |  | 7.40 | 1.40 | 1.10 | 0.21 |
|  | 2.69 | 300 | 3.60 | 1.40 | 0.91 | 0.21 |
|  | 5.15 |  | 6.20 | 1.50 | 1.05 | 0.31 |
|  | 6.30 |  | 7.50 | 1.50 | 1.20 | 0.31 |

FSW Fixture

A FSW fixture is a key factor in determining weld quality. The fixture rigidly holds the material to be welded in place and also acts as a heat sink. In order for the development of an on-line system, the HT wedge/transducer unit and the scanning assembly must fit between a bar which is used to clamp down the material (a.k.a. chill bar) and pin tool. An issue arises in many welding cases as the chill bar is typically placed very close to the weld seam which would not allow typical HT transducers found in the market available to be employed in this application.

Figure 26:
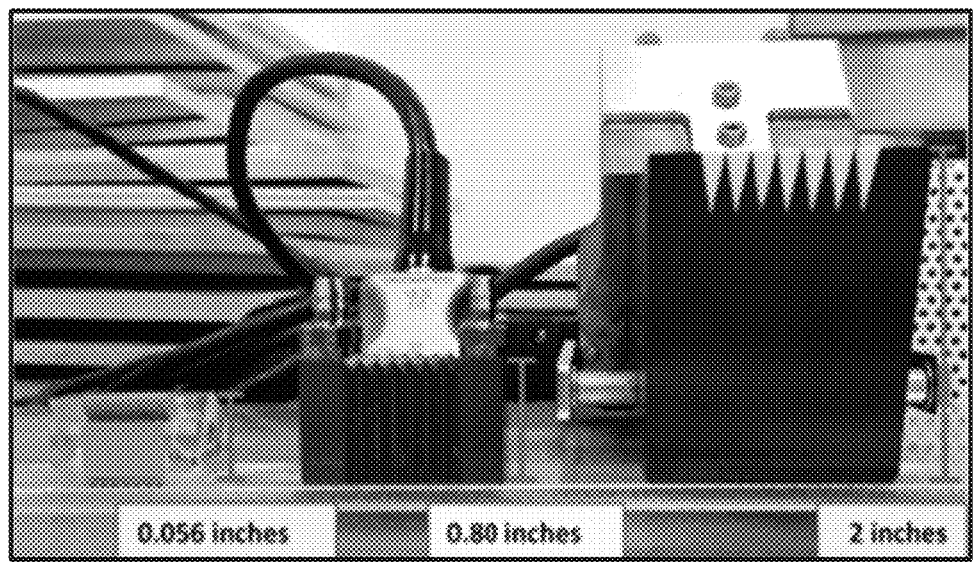
FIG. 26 shows a PAUT ambient temperature wedge (left), a custom HT wedge (middle), and a commercial HT wedge (right)
Figure 27:
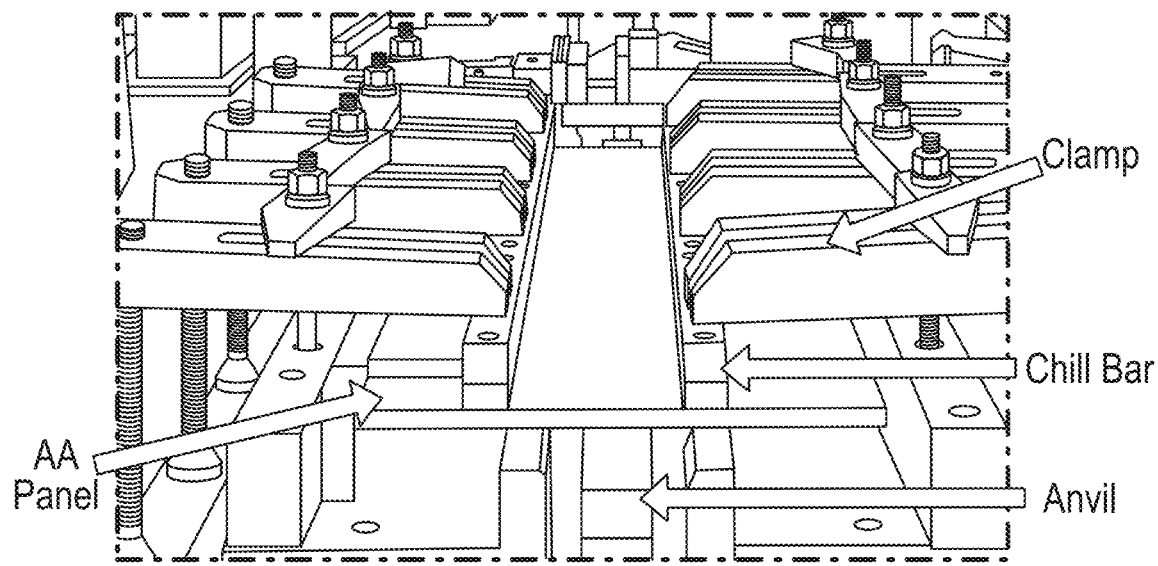
FIG. 27 is an image of a FSW fixture with which the HT wedge according to some embodiments can be used.

FIG. 26 shows a size comparison of a typical industrial HT wedge (right), a room temperature wedge (left), and a newly developed HT wedge (middle). The HT wedge is prohibitively large and bulky, and cannot be integrated with a FSW system. This wedge according to some embodiments of the invention is the first of its kind in that the HT/transducer unit is designed in consideration of the fixture geometries utilized in the aforementioned extensive AA-2219-T87 study. An example fixture is shown in FIG. 27. Depending on the geometry of the fixture and pin tool, the dimensions of the wedge/transducer setup can be further adapted.

In order to utilize the current HT wedge/transducer setup, the chill bar on the AS was shifted from a nominal position of 1 inch (2.5 cm) from the weld seam to 3 inches (7.6 cm) to compensate for the length of the HT wedge. This distance was considered safe to ensure that the wedge would not come into contact with the pin tool; however, moving the chill bar farther from the weld seam could result in a change in weld quality. The most obvious issue is that the workpiece will not be clamped as rigidly compared to the nominal position. In an automated system, the wedge/transducer unit can be closer to the weld seam allowing the chill bar to be placed closer.

On-Line PAUT During FSW

Figure 28:
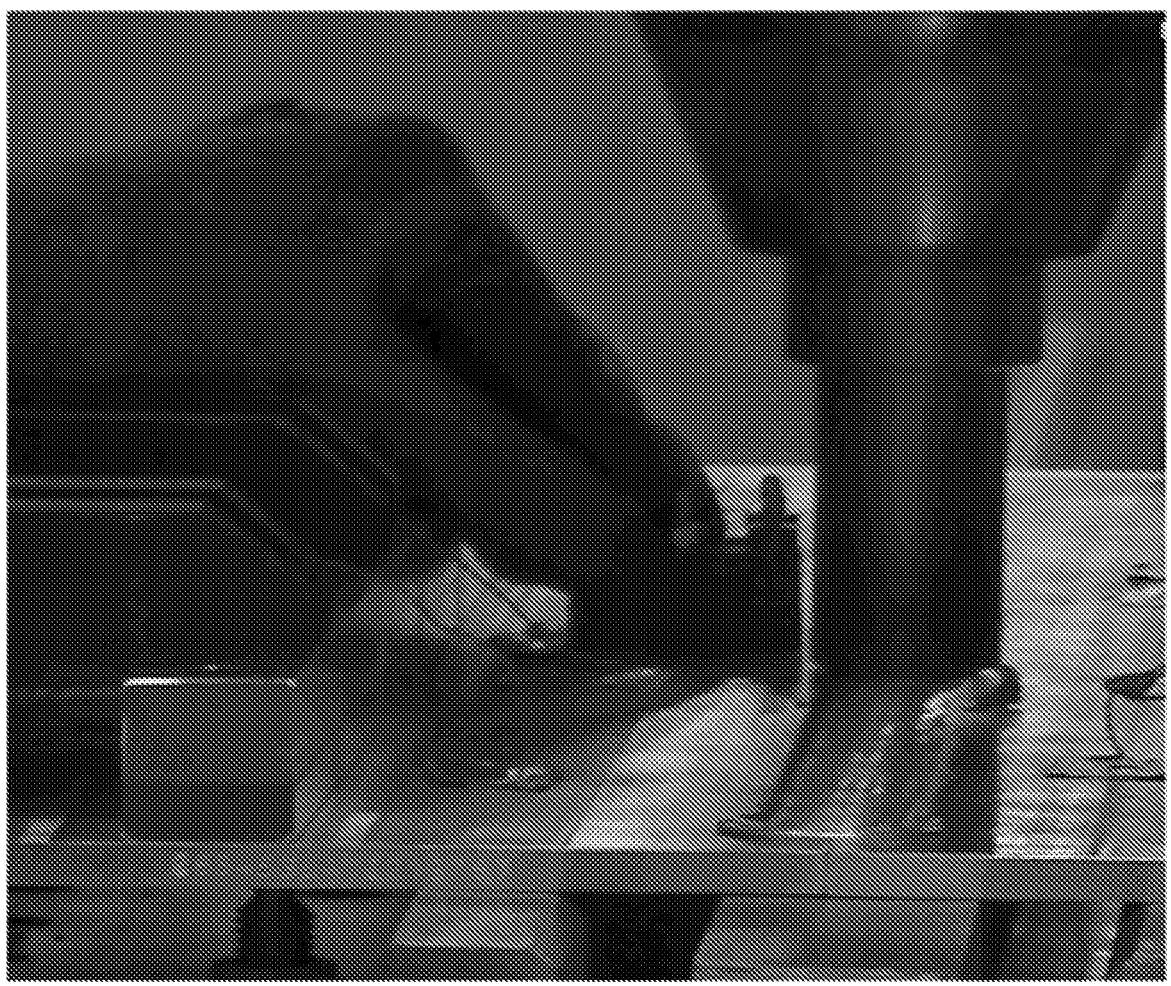
FIG. 28 shows a PAUT HT wedge/transducer unit according to some embodiments of the invention performing scanning during FSW.

During welding experimentation, an I-Stir Process Development System (PDS) FS welder was employed to test the PAUT system. The experiment entailed placing the HT wedge/transducer unit roughly 25 mm away from the weld seam on the AS. This distance allowed enough clearance for the pin tool during welding, as can be seen in FIG. 28. The wedge/transducer unit was placed by hand to scan the workpiece before, during, and after the FSW fixed pin tool traversed the weld seam. A high temperature couplant called Pyrogel, which has an operating range of 315° C., was employed for HT tests. In a similar fashion this method was conducted multiple times during each weld experiment. Four weld schedules were analyzed and can be observed in Table 4. The weld schedules chosen were conducted to obtain two nominal welds and two defect welds to observe the performance of the online PAUT system.

TABLE 4

FSW Process Parameters for Online PAUT Demos

| Weld Schedule | Rotational Speed [rpm] | Travel Speed [mm/min] | Plunge Force [kN] | UTS [MPa] | Quality |
| --- | --- | --- | --- | --- | --- |
| 1 | 350 | 76.2 | 15.57 | 317.98 | Nominal |
| 2 | 300 | 152.4 | 26.69 | 324.83 | Nominal |
| 3 | 350 | 152.4 | 22.24 | 277.50 | Defect |
| 4 | 300 | 152.4 | 17.79 | 150.15 | Defect |

The above experiments confirmed that the PAUT HT wedge/transducer unit performed well. The wedge/transducer was able to assess the weld seam in the high temperature environment. Due to the position of the wedge/transducer and butt-joint configuration, before the pin tool passed the scanning area to make the weld a large defect is signaled by the PAUT system due to the un-welded seam. The high frequency waves reflecting off the wall have the appearance of a large defect. For the defect free experiments, once the pin tool traversed the weld seam material was consolidated providing no defect signals. However, when defects are welded into the workpiece the PAUT system is able to capture them.

Figure 29:
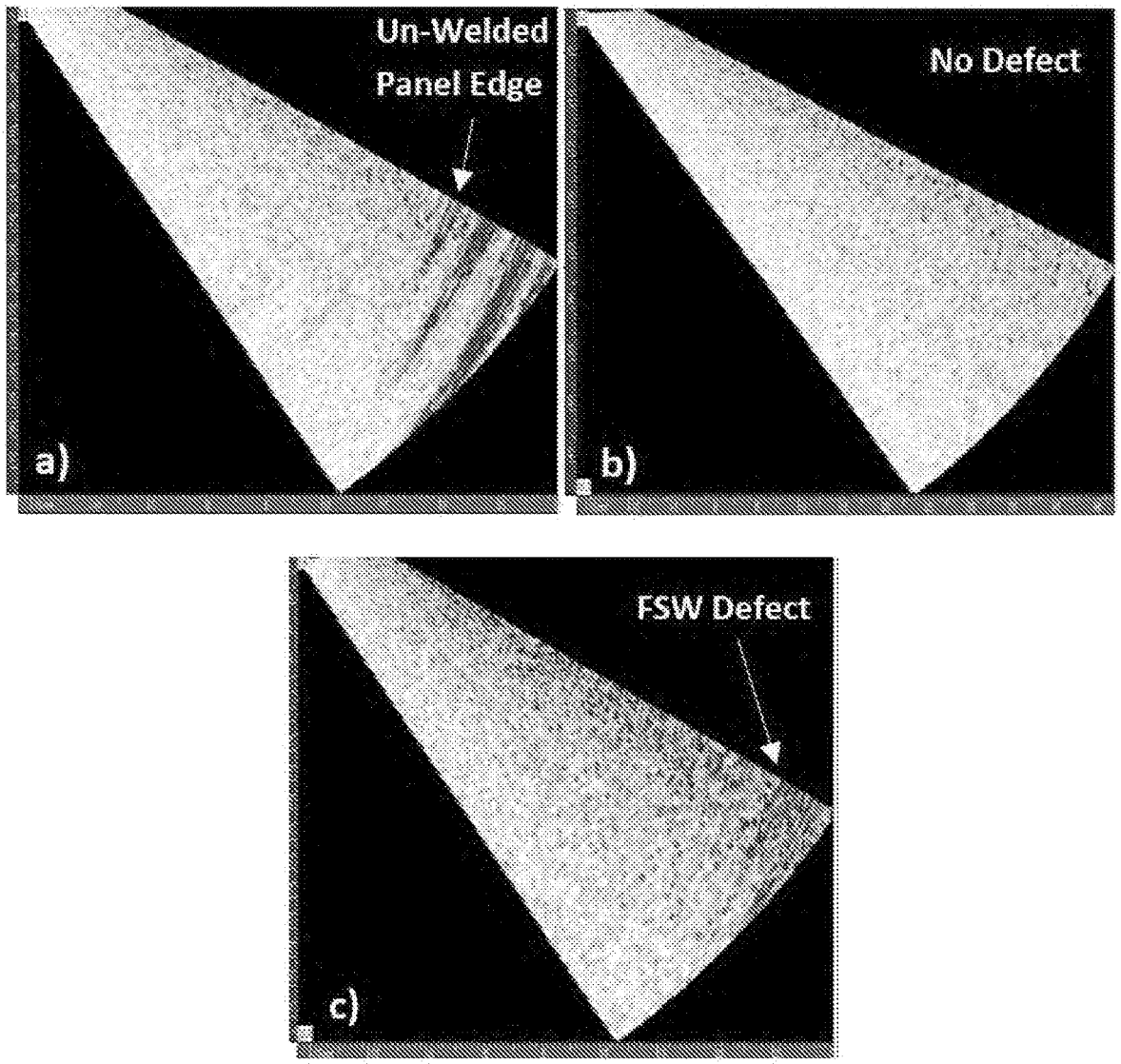
FIG. 29 shows PAUT S-scan images of HT wedge/transducer unit signals: a) for an un-welded seam, b) for a nominal welded seam, c) for a TR defect welded seam.

FIG. 29 illustrates the S-scan images of the un-welded seam, nominal weld without defect, and weld with defect. As discussed previously, multiple legs are employed to scan the entire welded area. Consequently, care must be applied in interpreting the results as the distance for scanning in these experiments employed three legs, which can have adverse effects on correctly interpreting defect signals.

Figure 30:
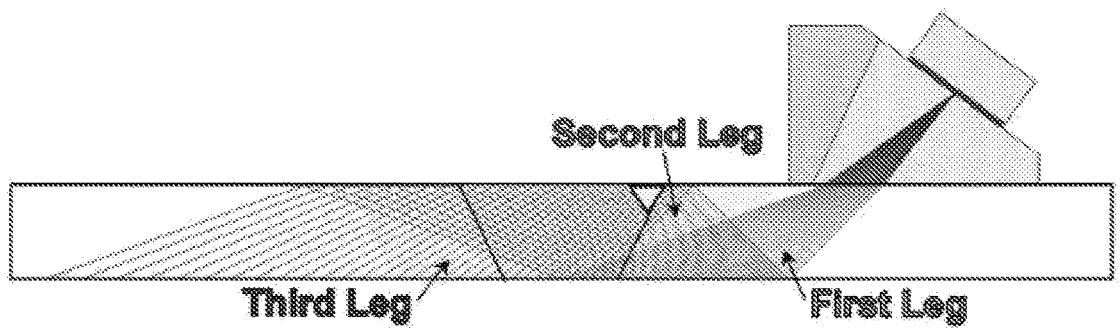

In image (c) of FIG. 29, only signals generated at large angles could determine the defect due to the distance the probe was placed from the weld seam, as indicated by FIG. 30. Here the first defect image was found by the second leg, and thereafter the second defect image was found by the third leg. The back-wall was not found in image (b) shown in FIG. 29 due to the filter that was applied for scanning; moreover, as there is attenuation increase the back-wall signal was not able to be found. In images (a) and (c) in FIG. 29, the back-wall is located at the same location of the defect, hence it is hard to distinguish.

The results presented herein indicate successful online NDE of FSW in real-time. In this work, extensive calibration and testing was required to accurately utilize a custom wedge, high temperature scanning, and FSW fixture accommodation. The system and methods provided herein cut down cost and delivery time for FSW manufacturing processes.

A systematic study of PAUT for both post-weld and online inspection has been presented. Moreover, the capability of HT PAUT in detecting various forms of defective FS welds has been investigated and compared with X-ray radiography. A necessary study was conducted to illustrate the subtleties of PAUT operation with respect to the FSW technique. As the newly developed FSW process expands in industry, post-weld inspection will be heavily relied upon. It has been shown that the PAUT technique is an excellent choice for this undertaking and is also more reliable than X-ray radiography. The importance of A-scan amplitude, index offset, TCG calibration, PAUT image analysis, and defect sizing have been addressed.

IP defects can be detrimental to aerospace industries as they are difficult to detect with PAUT and X-ray radiographic NDE techniques. IP defects are able to be discovered with increase in gain compared to the system calibrated for typical scanning procedures. Furthermore, successful implementation of a wedge/transducer unit for high temperature application has been shown. With an increase in temperature, PAUT software calibration is required to compensate for material property changes. For the first time, PAUT has been applied in real time during FSW.

The system described herein can be used in an on-line scanning system, which can be employed to automate NDE sensing of FSW. This will greatly aid manufacturing processes.

REFERENCES FOR EXAMPLES SECTION

[1] A. Leonard and S. Lockyer. 4th International Symposium on Friction Stir Welding. Park City, Utah, USA. (2003)
[2] R. J. Ditchburn, S. K. Burke, and C. M. Scala. *NDT&E Int.* 29(2): 111-117 (1996)
[3] L. S. Rosado, T. G. Santos, M. Piedade, P. M. Ramos, and P. Vilaça. *Measurement.* 43(8): 1021-1030 (2010)
[4] L. S. Rosado, F. A. Cardoso, S. Cardoso, P. M. Ramos, P. P. Freitas, and M. Piedade. *Sensor Actuat A-Phys.* 212: 58-67 (2014)
[5] L. S. Rosado, T. G. Santos, P. M. Ramos, P. Vilaca, and M. Piedade. *NDT&E Int.* 51: 85-93 (2012)
[6] C. Mandache, D. Levesque, L. Dubourg, and P. Gougeon. *Sci Technol Weld Joi.* 17(4): 295-303 (2012)
[7] T. G. Santos, P. Vilaca, and R. M. Miranda. *J Mater Process Manu.* 211(2): 174-180 (2011)
[8] T. G. Santos, P. Vilaca, J. dos Santos, and L. Quintino. *Weld World.* 53(5-6): 99-108 (2009)
[9] C. Mandache, L. Dubourg, A. Merati, and M. Jahazi. *Mater Eval.* 66(4): 382-386 (2008)
[10] T. G. Santos, B. S. Silva, P. D. Vilaca, J. M. C. Sousa, and L. Quintino. *Soldagem Insp.* 12(3): 179-187 (2007)
[11] R. A. Smith. *Insight.* 47(3): 133-143 (2005)
[12] G. Deuster. *Int. J Pres. Ves. Pip.* 35(1-4): 173-188 (1988)
[13] D. Choqueuse and A. Lamarre. Proceedings of the 8th International Offshore and Polar Engineering Conference. Montreal, Canada: ISOPE (1998)
[14] P. Crowther. *Insight.* 46(9): 525-528 (2004)
[15] M. Moles, N. Dube, and F. Jacques. Proceedings from Materials Solutions 2003 on Joining of Advanced and Specialty Materials. Pittsburgh, Pa., United states: ASM International. (2004)
[16] C. Schneider and C. Bird. 4th European-American Workshop on Reliability of NDE. Berlin, Germany. (2009)
[17] R. J. Ditchburn and M. E. Ibrahim. *Ultrasonic Phased Arrays for the Inspection of Thick-Section Welds.* Australian Department of Defense Science and Technology Organization (2009)
[18] Olympus Corporation. *Introduction to Phased Array Ultrasonic Technology Applications: R/D Tech Guideline.* 1$^{st}$ ed. Waltham, Mass., USA: Olympus NDT. (2004)
[19] Olympus Corporation. *Advances in Phased Array Ultrasonic Technology Applications*, Waltham, Mass., USA: Olympus NDT. (2007)

[20] W. Shi-Chang and S. Yijun. *Wave Motion.* 29(3): 245-265 (1999)
[21] W. D. Bruce and D. W. Paul. *NDT&E Int.* 39(7): 525-541 (2006)
[22] L. R. Joseph. *J. Press. Vess. T. ASME.* 124: 273-282 (2002)
[23] J. L. Rose. *IEEE T Ultrason Ferr.* 47: 575-583 (2000)
[24] J. L. Rose. *Ultrasonic Waves in Solid Media.* Cambridge University Press. (1999)
[25] L. Azar, Y. Shi, and S. C. Wooh. *NDT&E Int.* 33(3): 189-198 (2000)
[26] D. Achenbach. *Wave Propagation in Elastic Solids.* North-Holland Publishing Co., New York, N.Y. (1984)
[27] B. A. Auld. *Acoustic Fields and Waves in Solids.* $2^{nd}$ ed. Vol. 2. Kreiger Publishing Co., FL. (1990)
[28] L. W. Schmmer. *Mod. Phys, Lett B.* 22(11): 917-921 (2008)
[29] A. S. Birks, R. E. J. Green, and P. McIntire. *Nondestructive Testing Handbook.* $2^{nd}$ ed. Ultrasonic Testing. Vol. 7. Columbus, Ohio: American Society for Nondestructive Testing. (1991)
[30] B. Li, Y. Shen, W. Hu. *Mater Design.* 32(4): 2073-2084 (2011)
[31] C. Carpentier, J. Rudlin. 11th European Conference on Non-Destructive Testing. Prague, Czech Republic. (2014)
[32] M. W. Dewan, D. J. Huggett, T. W. Liao, M. A. Wahab, and A. M. Okeil. *Mater Design.* 92: 288-299 (2015)
[33] Olympus Corporation. *Flaw Detectors OmniScan MX2.* Available from: http://www.olympus-ims.com/en/omniscan-mx2/
[34] A. Lamarre, O. Dupuis, M. Moles. Proceedings of the 7th International Conference on Trends in Welding Research. Callaway Gardens Resort, Pine Mountain, Ga., USA. (2005)
[35] C. R. Bird. *Insight.* 46(1): 31-36 (2004)
[36] D. Kleiner and C. R. Bird. *Insight.* 46(2): 85-87 (2004)
[37] D. Levesque, L. Dubourg, and A. Blouin. *Nondestruct Test. Eval.* 26(3-4): 319-333 (2011)
[38] K. J. Kirk, A. McNab, A. Cochran, I. Hall, and G. Hayward. *IEEE T Ultrason Ferr.* 46(2): 311-319 (1999)
[39] R. Subbaratnam, S. T. Abraham, M. Menaka, B. Venkatraman, and B. Raj. *Mater Eval.* 66(3): 332-337 (2008)
[40] W. Johnson, F. Mauer, D. Pitchure, S. J. Norton, Y. Grinberg, and F. Bendec. *J. Mater. Res.* 8(7): 1558-1566 (1993)
[41] J. L. Shih, K. T. Wu, C. K. Jen, C. H. Chiu, J. C. Tzeng, and J. W. Liaw. *Sensors.* 13(1): 975-983 (2013)
[42] F. Tariq, N. Naz, R. Baloch, and Faisal. *J. Nondestruct Eval.* 31(1): 17-33 (2012)
[43] E. Oberg, F. Jones, H. Horton, H. Ryffel. *Temper Designations for Aluminum Alloys in Machinery's Handbook.* $29^{th}$ ed. Industrial Press. (2012)
[44] ASME, Article 23 Ultrasonic Standards, in SE-797. The Standard Practice for Measuring Thickness by Manual Ultrasonic Pulse-Echo Contact Method. (1998)

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:
1. A phased array ultrasonic testing system for friction stir welding, comprising:
a wedge body defining a coolant channel and at least one couplant channel;
a friction stir welder having a pin tool, the pin tool having a shoulder; and
a scanning assembly in mechanical connection with the wedge body, the scanning assembly comprising fixtures for securing the wedge body to the friction stir welder,
wherein the wedge body has a surface for disposing a phased array ultrasonic transducer comprising an array of ultrasonic elements,
wherein the coolant channel is formed in proximity to the surface for disposing the phased array ultrasonic transducer such that coolant flowing through the coolant channel maintains the phased array ultrasonic transducer below a predetermined temperature without obstructing the array of ultrasonic elements,
wherein the scanning assembly maintains a predetermined distance between the wedge body and a weld seam formed in a sample by the friction stir welder during a welding process,
wherein the scanning assembly further comprises a spring loaded system configured to provide a downward force on the wedge body,
wherein the scanning assembly further comprises a catch slide configured to allow the wedge body to be placed in front of the pin tool during start-up of the welding process, wherein the catch slide is configured to pull the wedge body after the pin tool passes the wedge body.

2. A phased array ultrasonic testing system for friction stir welding according to claim 1, wherein the scanning assembly comprises a wedge subassembly with arms secured to first and second sides of the wedge body.

3. A phased array ultrasonic testing system for friction stir welding according to claim 2, wherein the scanning assembly comprises an adjustment subassembly comprising an adjustable guiderail, wherein the adjustment subassembly allows motion of the wedge body in a direction perpendicular to a welding surface.

4. A phased array ultrasonic testing system for friction stir welding according to claim 3, wherein the scanning assembly comprises the adjustment subassembly slideably connected to the catch slide, wherein the catch slide enables motion of the wedge body with respect to the adjustment subassembly in a direction parallel to a welding surface.

5. A phased array ultrasonic testing system for friction stir welding according to claim 4, wherein the scanning assembly comprises a mounting subassembly in mechanical connection with the adjustment subassembly and comprising the fixtures configured to secure the wedge body to the friction stir welder.

6. A phased array ultrasonic testing system for friction stir welding according to claim 1, wherein the wedge body and the phased array ultrasonic transducer are operable on a sample having a surface temperature of at least 300° C.

7. A phased array ultrasonic testing system for friction stir welding according to claim 1, further comprising a data processing system in communication with the phased array ultrasonic transducer, wherein the data processing system is configured to receive signals from the phased array ultrasonic transducer and process the signals to form an A-scan, wherein the data processing system is configured to autonomously detect flaws and provide flaw detection information to an automatic feedback control system.

8. A phased array ultrasonic testing system for friction stir welding according to claim 7, wherein the data processing system is further configured to process the signals received from the phased array ultrasonic transducer to form an S-scan.

9. A phased array ultrasonic testing system for friction stir welding according to claim 1, wherein the scanning assembly is configured to move the wedge and the phased array ultrasonic transducer during a friction stir welding process such that the phased array ultrasonic transducer scans a portion of the weld seam for defects.

10. A phased array ultrasonic testing system for friction stir welding according to claim 1, further comprising:
a coolant pump in fluid connection with first and second ends of the coolant channel for circulating the coolant.

11. A phased array ultrasonic testing system for friction stir welding according to claim 1, further comprising:
a couplant pump in connection with a first end of the couplant channel for supplying couplant.

12. A phased array ultrasonic testing system for friction stir welding according to claim 11, wherein the couplant is high temperature couplant having an operating temperature of at least 300° C.

13. A phased array ultrasonic testing system for friction stir welding according to claim 1, wherein the wedge and the phased array ultrasonic transducer are located within approximately 30 mm of the weld seam.

14. A phased array ultrasonic testing system for friction stir welding according to claim 8, wherein the data processing system is configured to process the S-scan to autonomously detect flaws and provide flaw detection information to the automatic feedback control system.

15. A phased array ultrasonic testing system for friction stir welding according to claim 14, wherein the data processing system is configured to predict weld defects based on the signals received from the phased array ultrasonic transducer.

16. A phased array ultrasonic testing system for friction stir welding according to claim 7, wherein the automatic feedback control system commands weld process parameters based on the flaw detection information, wherein the weld process parameters are at least one of force, spindle speed, and welding speed.

17. A phased array ultrasonic system for friction stir welding according to claim 1, wherein the wedge body is located within 50 mm of the weld seam, and wherein a center of the wedge body is located within 3.5 mm behind and edge of the shoulder during welding.

* * * * *